(12) United States Patent
Mizuguchi

(10) Patent No.: US 7,161,746 B2
(45) Date of Patent: *Jan. 9, 2007

(54) FISHEYE LENS

(75) Inventor: Keiko Mizuguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/008,169

(22) Filed: Dec. 10, 2004

(65) Prior Publication Data

US 2005/0094286 A1 May 5, 2005

Related U.S. Application Data

(63) Continuation of application No. 10/631,760, filed on Aug. 1, 2003, now Pat. No. 6,844,991.

(30) Foreign Application Priority Data

| Aug. 1, 2002 | (JP) | ............................ 2002-224994 |
| Aug. 1, 2002 | (JP) | ............................ 2002-225001 |
| Feb. 27, 2003 | (JP) | ............................ 2003-051432 |
| Jul. 15, 2003 | (JP) | ............................ 2003-197315 |

(51) Int. Cl.
*G02B 13/04* (2006.01)

(52) U.S. Cl. ..................... 359/749; 359/752; 359/753

(58) Field of Classification Search ................ 359/725, 359/749, 752, 753
See application file for complete search history.

(56) References Cited

U.S. PATENT DOCUMENTS

| 4,256,373 A | 3/1981 | Horimoto .................... 359/755 |
| 6,844,991 B1* | 1/2005 | Mizuguchi .................. 359/749 |

FOREIGN PATENT DOCUMENTS

| JP | 51-2826 | 1/1976 |
| JP | 54-32319 | 3/1979 |
| JP | 2-248910 | 10/1990 |
| JP | 2000-356739 | 12/2000 |

* cited by examiner

*Primary Examiner*—David N. Spector
(74) *Attorney, Agent, or Firm*—Miles & Stockbridge P.C.

(57) ABSTRACT

An object of the present invention is to provide a fisheye lens, in spite of its compactness, having an angle of view of 180 degrees and a fast f-number of 2.8 with securing sufficient back focal length and suitable for a digital camera. The fisheye lens consists of a front lens group G1 having negative refractive power and a rear lens group G2 having positive refractive power locating with a space along the optical axis apart from the front lens group G1. The front lens group G1 includes a plurality of negative lens components, L1 and L2. The rear lens group G2 includes at least one cemented lens L5, and given conditional expressions are satisfied.

38 Claims, 20 Drawing Sheets

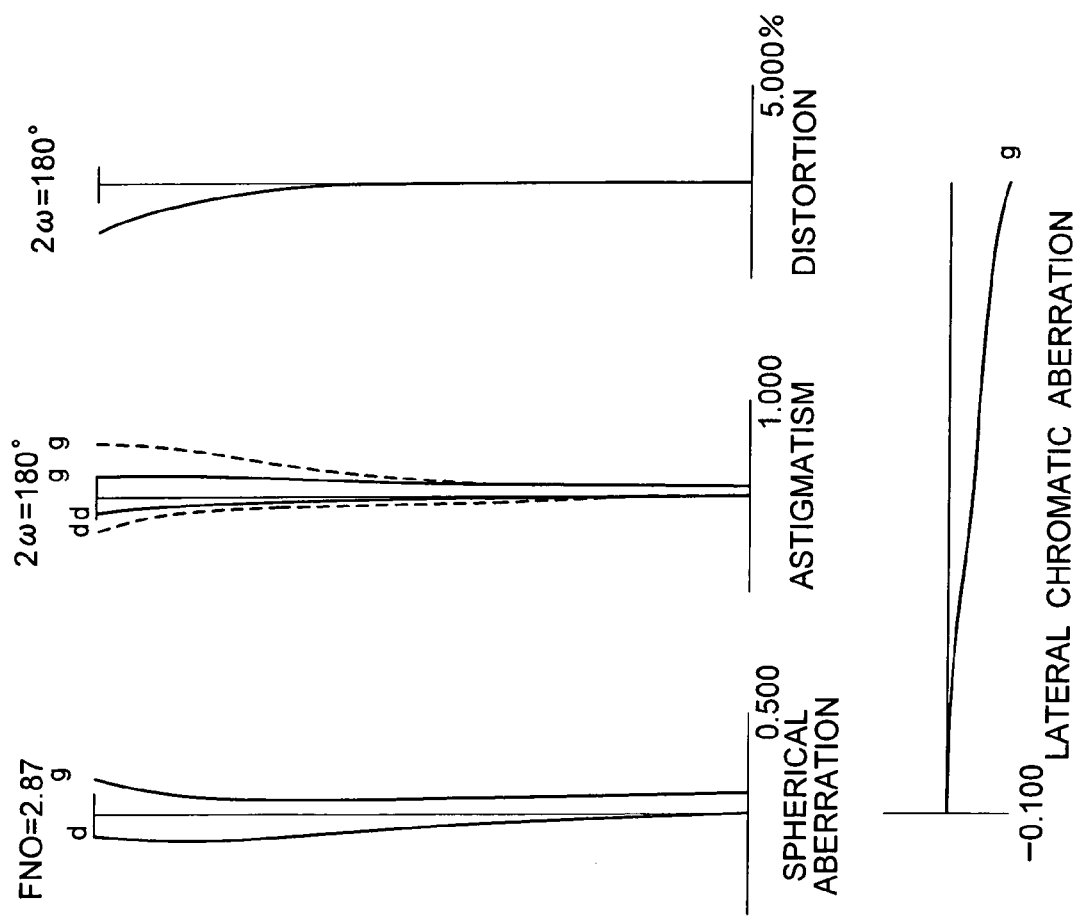

FISHEYE LENS

CROSS-REFERENCE TO RELATED APPLICATION

This application is a continuation of application Ser. No. 10/631,760 filed Aug. 1, 2003 now U.S. Pat. No. 6,844,991.

This application claims the benefit of Japanese Patent applications No. 2002-224994, No. 2002-225001, No. 2003-051432 and No. 2003-197315 which are hereby incorporated by reference.

BACKGROUND OF THE INVENTION

1. Field of the Invention

The present invention relates to a fisheye lens sufficiently securing an equivalent air distance between the last lens surface and the image plane, in spite of its compactness, suitable for a SLR camera and in particular for a SLR digital camera.

2. Related Background Art

Almost all fisheye lenses for a SLR camera have an image size corresponding to 35-mm films (For example, Japanese Patent Application Laid-Open No. 54-32319.) Even if these fisheye lenses are directly used in a SLR digital camera, the angle of view of 180 degrees cannot be secured because due to the image size the relation between the focal length and the angle of view of a SLR digital camera is different from that of a SLR film camera.

Generally, the size of the imaging plane of an imaging device for a SLR digital camera is a little smaller than the film frame size of 35-mm films. Accordingly, "the diagonal of the image size of 35-mm film frame" divided by "the diagonal of the image size of the imaging device" multiplied by the focal length of the lens becomes the focal length (converted focal length to 35-mm film format) of the lens used in a SLR digital camera.

Therefore, when a fisheye lens for a SLR film camera having the angle of view of 180 degrees is directly used in a SLR digital camera, no more than n effect of a super wide-angle lens can be obtained.

As described above, the angle of view of a SLR digital camera whose image size is a little smaller than that of a SLR film camera inevitably becomes narrow. Moreover, when you want to take a photograph of a wide area with use of a fisheye lens, the focal length has to be set even shorter. As a result, since the back focal length of a fisheye lens for a SLR digital camera is required to become more than 3 times as large as the focal length, an extremely strong divergent lens group has to be located to the object side of the lens system.

In a fisheye lens, a retrofocus type in which the principal point is located backward is used. However, since an extremely strong divergent lens group is located to the object side of the lens system, optical performance tends to be deteriorated due to curvature of field and astigmatism.

Moreover, in the retrofocus type, the diameter of the negative lens in the front lens group tends to become large, so that it is a problem that the fisheye lens becomes larger and heavier.

SUMMARY OF THE INVENTION

The present invention is made in view of the aforementioned problems and has an object to provide a fisheye lens, in spite of its compactness, having superb optical performance with well corrected curvature of field sufficiently secured the back focal length suitable for a SLR digital camera.

According to one aspect of the present invention, a fisheye lens consists of a front lens group having negative refractive power and a rear lens group having positive refractive power locating with a space along the optical axis apart from the front lens group. The front lens group includes, in order from an object, a plurality of negative lens components. The rear lens group includes at least one cemented lens, and the following conditional expression is satisfied:

$$4.0 \leq \Sigma d/f \leq 10.0 \qquad (1)$$

where f denotes the focal length of the fisheye lens and $\Sigma d$ denotes the distance from the most object side lens surface to the most image side lens surface of the fisheye lens when focusing at infinity.

In one preferred embodiment of the present invention, the front lens group includes at least one cemented lens.

In one preferred embodiment of the present invention, the following conditional expression is preferably satisfied;

$$1.5 \leq f2/f \leq 4.0 \qquad (2)$$

where f2 denotes the focal length of the rear lens group.

In one preferred embodiment of the present invention, the rear lens group includes, in order from the object, a positive lens component, a cemented lens component constructed by a negative lens element cemented with a positive lens element, and a positive lens component. The following conditional expression is preferably satisfied;

$$0.5 < d1/f < 2.0 \qquad (3)$$

where d1 denotes the distance along the optical axis between the front lens group and the rear lens group.

In one preferred embodiment of the present invention, elements in the rear lens group the following conditional expression is preferably satisfied;

$$30 \leq vRP - vRN \leq 60 \qquad (4)$$

where vRP denotes the mean value of Abbe numbers of the positive lens elements in the lens components in the rear lens group and vRN denotes the mean value of Abbe numbers of the negative lens elements in the lens components in the rear lens group.

In one preferred embodiment of the present invention, the following conditional expression is preferably satisfied;

$$0.2 \leq nRN - nRP \leq 0.45 \qquad (5)$$

where nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

According to another aspect of the present invention, a fisheye lens consists of a front lens group having negative refractive power and a rear lens group having positive refractive power locating with a space along the optical axis apart from the front lens group. The front lens group includes, in order from an object, a plurality of negative lens components, and two sets of cemented lens components. At least one of the two sets of cemented lens components is arranged a negative lens element to the object side and the negative lens element satisfies the following conditional expression:

$$1.0 < |R|/f < 4.0 \qquad (6)$$

where f denotes the focal length of the fisheye lens and R denotes the radius of curvature of the object side surface of the negative lens element arranged to the object side.

In one preferred embodiment of the present invention, the front lens group consists of, in order from the object, a first lens component having a negative meniscus shape with a convex surface facing to the object, a second lens component having a negative meniscus shape with a convex surface facing to the object, a third lens component being a cemented lens component constructed by a negative lens element cemented with a positive lens element, and a fourth lens component being a cemented lens component constructed by a positive lens element cemented with a negative lens element. The plurality of negative lens components are composed of the first lens component and the second lens component, and the two cemented lens components are composed of the third lens component and the fourth lens component.

In one preferred embodiment of the present invention, the front lens group includes, in order from the object, a first lens component having a negative meniscus shape with a convex surface facing to the object, a second lens component having a negative meniscus shape with a convex surface facing to the object, a third lens component being a cemented lens component constructed by a negative lens element cemented with a positive lens element, a fourth lens component being a positive lens element, and a fifth lens component being a cemented lens component constructed by a positive lens element cemented with a negative lens element. The plurality of negative lens components are composed of the first lens component and the second lens component, and the two sets of cemented lens components are composed of the third lens component and the fifth lens component.

In one preferred embodiment of the present invention, the front lens group includes, in order from the object, a first lens component having a negative meniscus shape with a convex surface facing to the object, a second lens component having a negative meniscus shape with a convex surface facing to the object, a third lens component being a positive lens element, a fourth lens component being a cemented lens component constructed by a negative lens element cemented with a positive lens element, and a fifth lens component being a cemented lens component constructed by a positive lens element cemented with a negative lens element. The plurality of negative lens components are composed of the first lens component and the second lens component, and the two sets of cemented lenses are composed of the fourth lens component and the fifth lens component.

In one preferred embodiment of the present invention, the following conditional expressions are preferably satisfied;

$$4.0 \leq \Sigma d/f \leq 10.0 \quad (7)$$

$$1.5 \leq f2/f \leq 4.0 \quad (8)$$

where $\Sigma d$ denotes the distance from the most object side lens surface to the most image side lens surface of the fisheye lens when focusing at infinity and f2 denotes the focal length of the rear lens group.

In one preferred embodiment of the present invention, the rear lens group includes, in order from the object, a positive lens component, a cemented lens component constructed by a negative lens element cemented with a positive lens element, and a positive lens component. The following conditional expression is preferably satisfied;

$$0.5 < d1/f < 2.0 \quad (9)$$

where d1 denotes the distance along the optical axis between the front lens group and the rear lens group.

In one preferred embodiment of the present invention, the cemented lens in the rear lens group is preferably satisfied either one or both of the following conditional expressions;

$$30 \leq vRP - vRN \leq 60 \quad (10)$$

$$0.2 \leq nRN - nRP \leq 0.45 \quad (11)$$

where vRP denotes the mean value of Abbe numbers of the positive lens elements in the lens components in the rear lens group, vRN denotes the mean value of Abbe numbers of the negative lens elements in the lens components in the rear lens group, nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

According to another aspect of the present invention, a fisheye lens consists of a front lens group having negative refractive power and a rear lens group having positive refractive power locating with a space along the optical axis apart from the front lens group. The front lens group includes, in order from an object, a plurality of negative lens components and a cemented lens component. The rear lens group includes a cemented lens component and the following conditional expression is satisfied:

$$Bf/f \geq 3.45 \quad (12)$$

$$0.5 < d1/f < 2.0 \quad (15)$$

where Bf denotes the back focal length of the fisheye lens, d1 denotes the distance along the optical axis between the most image side lens surface of the front lens group and the most object side lens surface of the rear lens group, and f denotes the focal length of the fisheye lens.

In one preferred embodiment of the present invention, the following conditional expression is preferably satisfied;

$$4.0 \leq \Sigma d/f \leq 10.0 \quad (13)$$

where f denotes the focal length of the fisheye lens and $\Sigma d$ denotes the distance from the most object side lens surface to the most image side lens surface of the fisheye lens when focusing at infinity.

In one preferred embodiment of the present invention, the front lens group includes, in order from the object, a first lens component having a negative meniscus shape with a convex surface facing to the object, a second lens component having a negative meniscus shape with a convex surface facing to the object, and a third lens component being a cemented lens component constructed by a negative lens element cemented with a positive lens element.

In one preferred embodiment of the present invention, the front lens group includes, in order from the object, a first lens component having a negative meniscus shape with a convex surface facing to the object, a second lens component having a negative meniscus shape with a convex surface facing to the object, a third lens component being an only negative lens element, and a fourth lens component being a cemented lens component constructed by a positive lens element cemented with a negative lens element.

In one preferred embodiment of the present invention, the front lens group includes, in order from the object, a first lens component having a negative meniscus shape with a convex surface facing to the object, a second lens component having a negative meniscus shape with a convex surface facing to the object, a third lens component being an only positive lens element, and a fourth lens component being a cemented lens component constructed by a positive lens element cemented with a negative lens element.

In one preferred embodiment of the present invention, the rear lens group includes, in order from the object, a positive lens component, a cemented lens component constructed by a negative lens element cemented with a positive lens element, and a positive lens component. The following conditional expressions are preferably satisfied;

$$1.5 \leq f2/f \leq 4.0 \tag{14}$$

where f2 denotes the focal length of the rear lens group.

In one preferred embodiment of the present invention, the cemented lens in the rear lens group is preferably satisfied the following conditional expressions;

$$30 \leq vRP-vRN \leq 60 \tag{16}$$

$$0.2 \leq nRN-nRP \leq 0.45 \tag{17}$$

where vRP denotes the mean value of Abbe numbers of the positive lens elements in the lens components in the rear lens group, vRN denotes the mean value of Abbe numbers of the negative lens elements in the lens components in the rear lens group, nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

In one preferred embodiment of the present invention, each of all lens surfaces of the front lens group and the rear lens group is constructed by any one of a spherical surface and a plane surface.

In one preferred embodiment of the present invention, when the focusing of the lens is moved from infinity to close object, the lens is moved to the object side with increasing the distance between the front lens group and the rear lens group.

Other feature and advantages according to the present invention will be readily understood from the detailed description of the preferred embodiments in conjunction with the accompanying drawings.

BRIEF DESCRIPTION OF THE DRAWINGS

FIG. 20 graphically shows various aberrations of the fisheye lens according to Example 10 of the present invention.

DESCRIPTION OF THE PREFERRED EMBODIMENTS

First Embodiment

Figure 1:
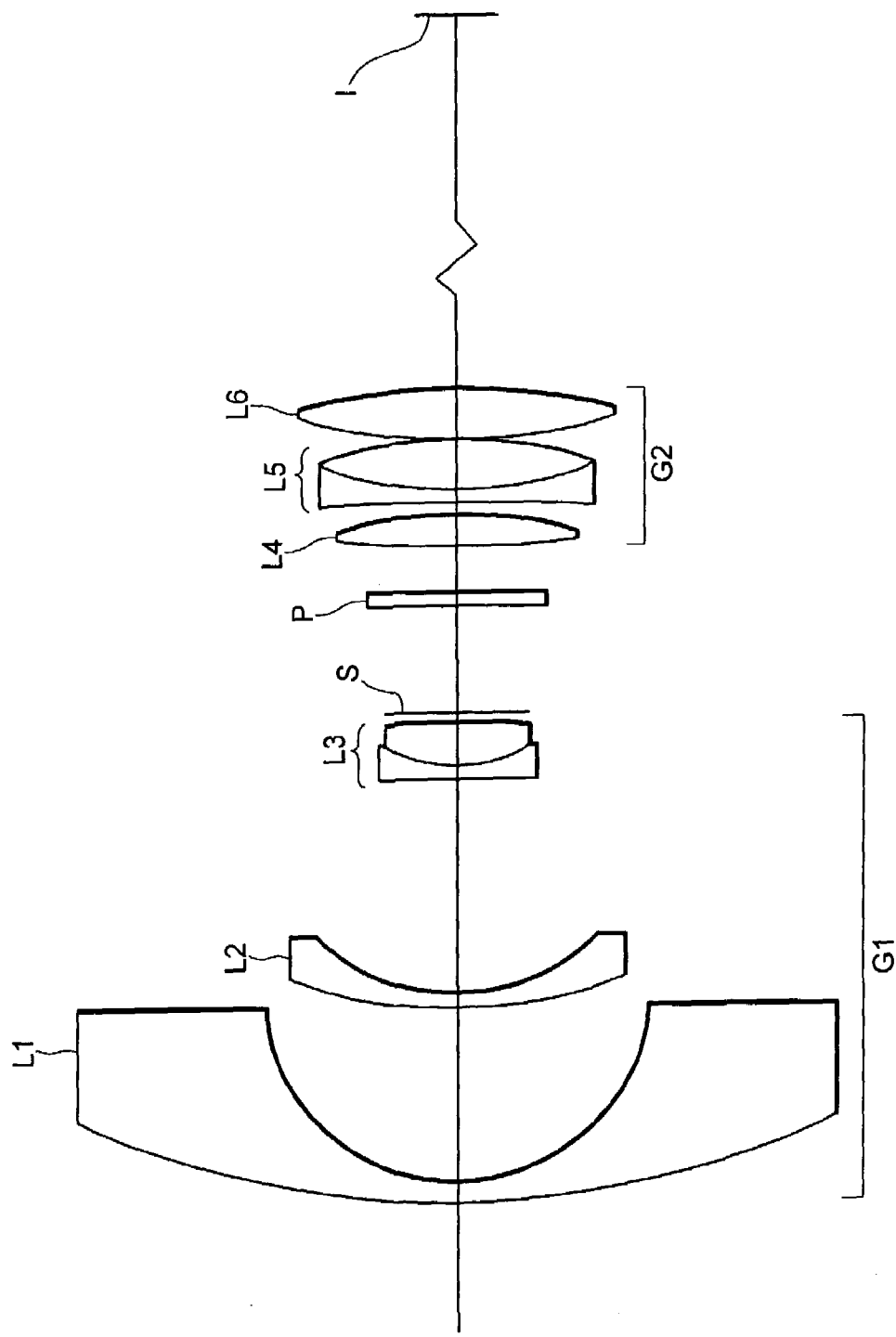
FIG. 1 is a sectional view showing the lens arrangement of a fisheye lens according to Example 1 of a first embodiment and Example 15 of a third embodiment of the present invention.
Figure 2:
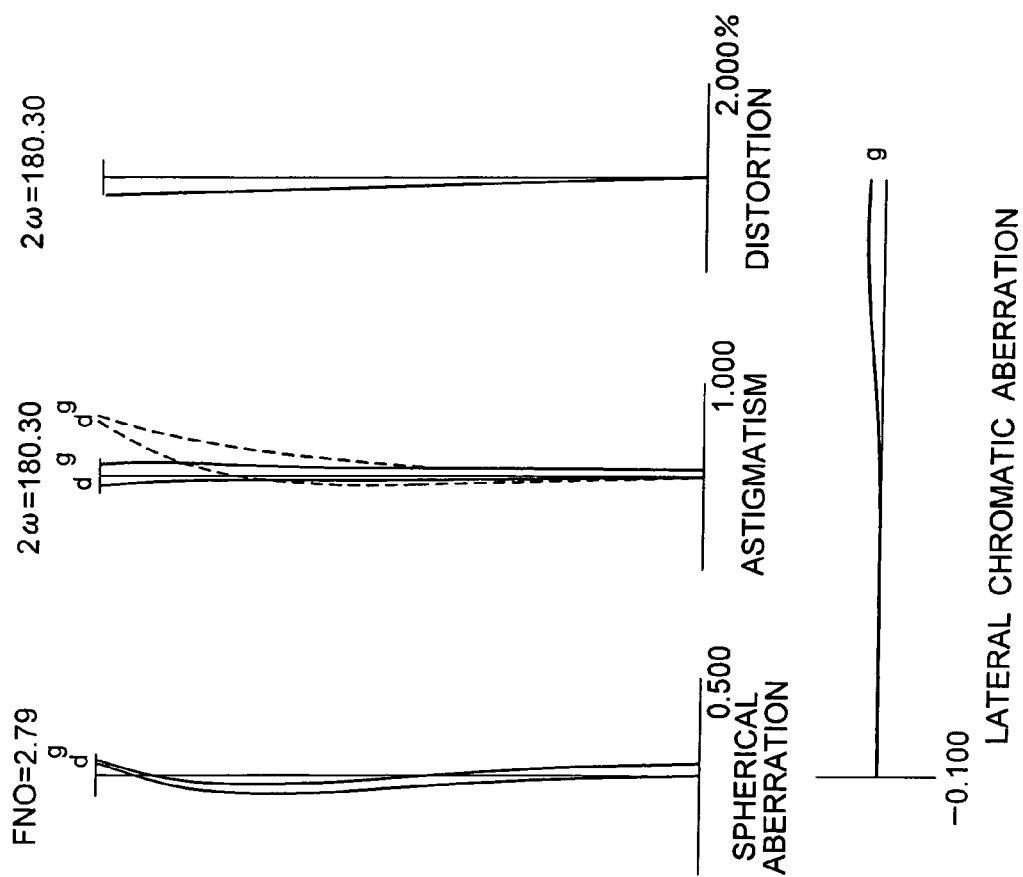
FIG. 2 graphically shows various aberrations of the fisheye lens according to Example 1 and Example 15 of the present invention.

A fisheye lens according to a first embodiment of the present invention is explained below.

A fisheye lens according to the first embodiment of the present invention consists of a front lens group having negative refractive power and a rear lens group having positive refractive power locating with a space along the optical axis apart from the front lens group. The front lens group includes a plurality of negative lens components. The rear lens group includes at least one cemented lens component.

The front lens group has a negative refractive power component having strong divergent effect to deflect light ray entering from a wide incident range of 180 degrees to a direction parallel to the optical axis. By constructing the negative refractive power component of the front lens group with a plurality of negative lens components, aberrations produced thereby can be spread to or shared by the plurality of the negative lens components.

In the first embodiment, the following conditional expression is satisfied:

$$4.0 \leq \Sigma d/f \leq 10.0 \quad (1)$$

Furthermore, at least one of the following conditional expressions is preferably satisfied.

$$1.5 \leq f2/f \leq 4.0 \quad (2)$$

$$0.5 < d1/f < 2.0 \quad (3)$$

$$30 \leq vRP - vRN \leq 60 \quad (4)$$

$$0.2 \leq nRN - nRP \leq 0.45 \quad (5)$$

where f denotes the focal length of the fisheye lens, Σd denotes the distance from the most object side lens surface to the most image side lens surface of the fisheye lens when focusing at infinity, f2 denotes the focal length of the rear lens group, d1 denotes the distance along the optical axis between the front lens group and the rear lens group, vRP denotes the mean value of Abbe numbers of the positive lens elements in the lens components in the rear lens group, vRN denotes the mean value of Abbe numbers of the negative lens elements in the lens components in the rear lens group, nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

In a fisheye lens according to the first embodiment of the present invention, conditional expression (1) is for controlling or determining the whole size and weight of the lens with securing sufficient back focal length and correcting off-axis aberrations. When the ratio Σd/f exceeds the upper limit of conditional expression (1), the back focal length becomes too short to be able to be used for a SLR camera. Moreover, in order to pass light ray entering from a wide incident range of 180 degrees, the diameter (front lens diameter) of the lens locating to the most object side becomes extremely large, so that the whole lens becomes large in size and heavy in weight. In order to obtain good optical performance, it is preferable that the upper limit is set to 8.0. On the other hand, when the ratio Σd/f falls below the lower limit of conditional expression (1), although the back focal length can be secured sufficiently, it becomes difficult to maintain the angle of view of 180 degrees, so that it is undesirable. In order to obtain good optical performance, it is preferable that the lower limit is set to 5.0.

In a fisheye lens according to the first embodiment of the present invention, conditional expression (2) defines an appropriate range of the focal length of the rear lens group with securing sufficient back focal length and correcting off-axis aberrations. When the ratio f2/f exceeds the upper limit of conditional expression (2), it becomes difficult to secure the angle of view of 180 degrees as well as to correct astigmatism and coma, so that it is undesirable. On the other hand, when the ratio f2/f falls below the lower limit of conditional expression (2), the back focal length becomes too short to be able to be used for a SLR camera.

In a fisheye lens according to the first embodiment of the present invention, conditional expression (3) defines an appropriate range of the distance along the optical axis between the front lens group and the rear lens group. When the ratio d1/f is higher than or equal to the upper limit of conditional expression (3), lateral chromatic aberration becomes too large to correct properly. In addition, the back focal length becomes too short to be able to be used for a SLR camera. On the other hand, when the ratio d1/f is less than or equal to the lower limit of conditional expression (3), it becomes difficult to secure the angle of view of 180 degrees as well as to correct astigmatism and coma, so that it is undesirable. These results are further improved, when the lower limit of conditional expression (3) is increased to 0.7.

In a fisheye lens according to the first embodiment of the present invention, conditional expression (4) defines an appropriate range of difference in Abbe numbers between the positive lens elements and negative lens elements of the rear lens group in order to correct lateral chromatic aberration and axial chromatic aberration produced in the front lens group. When the value vRP−vRN exceeds the upper limit of conditional expression (4), it becomes difficult to construct the lens system by available glass materials as well as to correct axial chromatic aberration. On the other hand, when the value vRP−vRN falls below the lower limit of conditional expression (4), lateral chromatic aberration produced by negative lenses in the front lens group becomes difficult to be corrected by the rear lens group and lateral chromatic aberration at g-line ($\lambda$=435.8 nm) tends to become negative, so that it is undesirable.

In a fisheye lens according to the first embodiment of the present invention, conditional expression (5) is for correcting curvature of field and astigmatism. By setting refractive index of the negative lens as high as possible and that of the positive lens as low as possible, Petzval sum of the whole lens system can be lowered and curvature of field and astigmatism can be suppressed to be small. When the value nRN−nRP exceeds the upper limit of conditional expression (5), the difference in Abbe numbers between negative lens elements and positive lens elements has to be set larger, so that it becomes difficult to correct axial chromatic aberration produced in the front lens group. On the other hand, when the value nRN−nRP falls below the lower limit of conditional expression (5), Petzval sum of the whole lens system becomes large to produce large amount of curvature of field, so that it is undesirable.

By the way, by including a cemented lens component in the front lens group, production of lateral chromatic aberration can be suppressed.

When the focusing of the lens is carried out from infinity to close object, in order to prevent degradation of optical performance when focusing to a close object, it is preferable that the lens is moved to the object side with increasing the distance between the front lens group and the rear lens group.

In the above-described construction, it is preferable that each lens surface of the front and rear lens groups is constructed by a spherical surface or a plane surface without using an aspherical surface. Accordingly, it becomes easier to manufacture, assemble, and adjust each lens element, so that manufacturing cost can be lowered.

Each example of the fisheye lens according to the first embodiment of the present invention is shown below.

FIGS. 1, 3, 5, 7, 9, 11, 13, 15, 17 and 19 are sectional views showing fisheye lenses according to Examples 1 through 10 of the first embodiment of the present invention, respectively. In respective sectional views, a plane parallel plate P, S and I denote a filter, an aperture stop, and an image plane, respectively. The filter and the aperture stop are arranged between the front lens group G1 and the rear lens group G2. The filter that may be inserted into any place in the fisheye lens has substantially no effect on the lens. Moreover, if the fisheye lens does not have the filter, the basic optical performance of the lens is not substantially affected.

FIGS. 2, 4, 6, 8, 10, 12, 14, 16, 18 and 20 graphically show various aberrations of the fisheye lenses according to Examples 1 through 10 of the first embodiment of the present invention, respectively. In respective graphs, d denotes aberration at d-line ($\lambda$=587.6 nm), g denotes aberration at g-line ($\lambda$=435.8 nm), m denotes meridional image plane, and s denotes sagittal image plane. FNO denotes f-number, and 2$\omega$ denotes the angle of view (unit: degree). Distortion is defined as a deviation from an equi-solid angle projection (y=fsin($\omega$/2)). As is shown from respective graphs, each aberration is corrected preferably.

In Tables showing respective Examples, f denotes the focal length (unit: mm) of the whole lens system, FNO denotes f-number, 2$\omega$ denotes the angle of view (unit: degree), Bf denotes the back focal length (unit: mm), and TL denotes the total lens length (unit: mm). In lens data, the number locating at the most left side column is the surface number, r denotes radius of curvature (unit: mm), nd denotes refractive index at d-line ($\lambda$=587.6 nm), v d denotes Abbe number, and S denotes an aperture stop.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used. The explanation of reference symbols is the same in the other example.

EXAMPLE 1

A fisheye lens according to Example 1 of the first embodiment shown in FIG. 1 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, and a third lens component L3 being a cemented positive lens component constructed by a negative lens element cemented with a positive lens element. The rear lens group G2 is composed of, in order from the object, a fourth lens component L4 having a double convex shape with a stronger convex surface facing to an image, a fifth lens component L5 being a cemented positive lens component constructed by a negative lens element cemented with a positive lens element, and a sixth lens component L6 having a double convex shape with positive refractive power.

Various values associating Example 1 are shown in Table 1.

TABLE 1

(Specification)

| | |
|---|---|
| f = | 10.0 |
| FNO = | 2.8 |
| 2$\omega$ = | 180.3 |
| Bf = | 38.0 |
| TL = | 101.9 |

TABLE 1-continued (Lens Data)

| Surface Number | r | d | vd | nd |
|---|---|---|---|---|
| 1 | 70.000 | 1.50 | 60.68 | 1.60311 |
| 2 | 14.900 | 13.60 | | 1.00000 |
| 3 | 36.500 | 1.00 | 49.61 | 1.77250 |
| 4 | 15.300 | 16.90 | | 1.00000 |
| 5 | −956.300 | 1.00 | 52.32 | 1.75500 |
| 6 | 10.250 | 3.60 | 31.07 | 1.68893 |
| 7 | −66.600 | 0.85 | | 1.00000 |
| 8 | S | 8.20 | | 1.00000 |
| 9 | ∞ | 1.00 | 64.14 | 1.51633 |
| 10 | ∞ | 3.98 | | 1.00000 |
| 11 | 78.500 | 2.43 | 90.3 | 1.45600 |
| 12 | −32.600 | 1.00 | | 1.00000 |
| 13 | −232.900 | 1.00 | 23.78 | 1.84666 |
| 14 | 27.200 | 4.00 | 70.24 | 1.48749 |
| 15 | −29.900 | 0.10 | | 1.00000 |
| 16 | 41.200 | 3.78 | 70.24 | 1.48749 |
| 17 | −45.873 | Bf | | 1.00000 |

(Values for the conditional expressions)

(1) $\Sigma$d/f = 6.394
(2) f2/f = 2.532
(3) d1/f = 1.403
(4) vRP − vRN = 53.15
(5) nRN − nRP = 0.370

EXAMPLE 2

Figure 3:
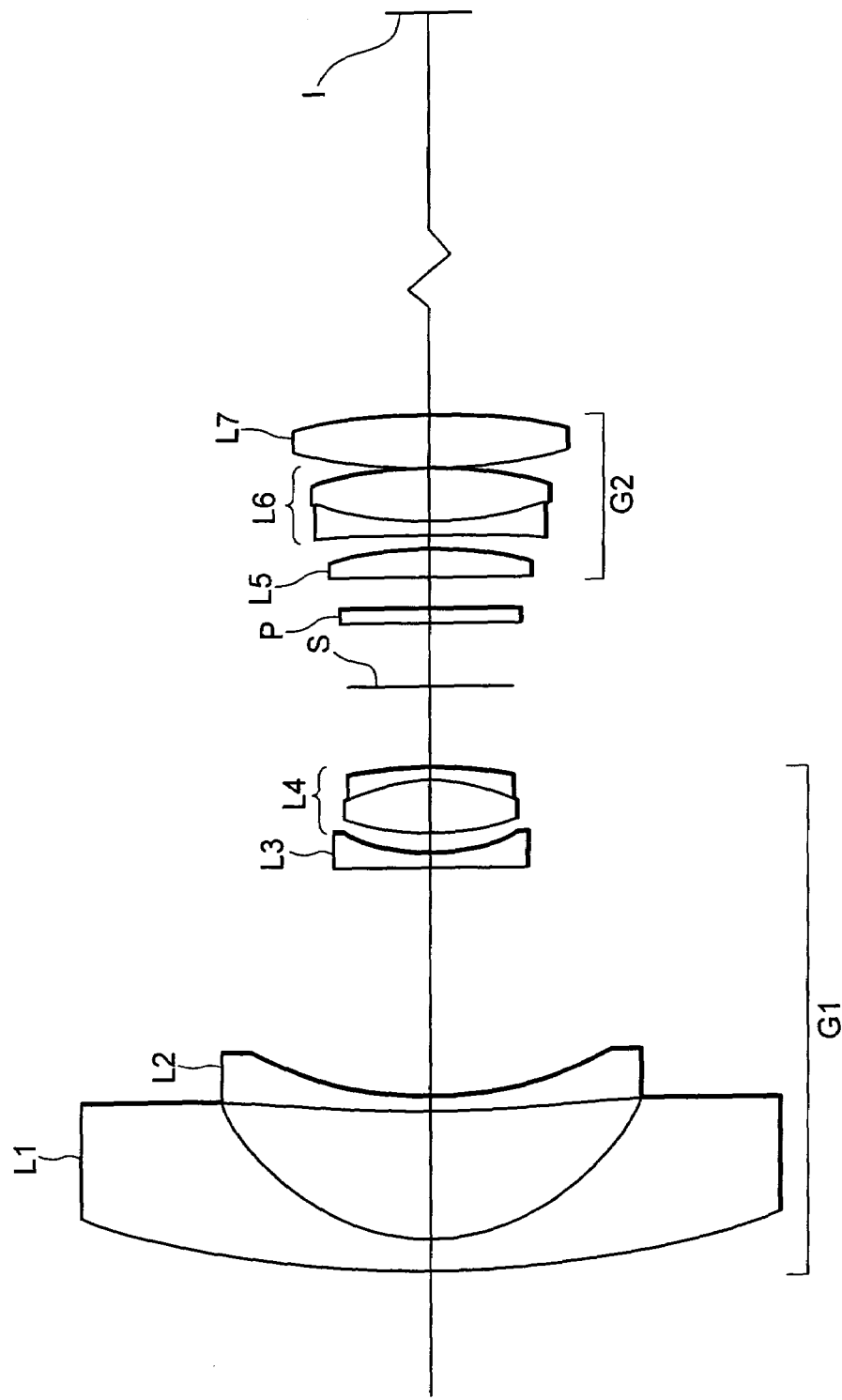
FIG. 3 is a sectional view showing the lens arrangement of a fisheye lens according to Example 2 of the first embodiment and Example 16 of the third embodiment of the present invention.
Figure 4:
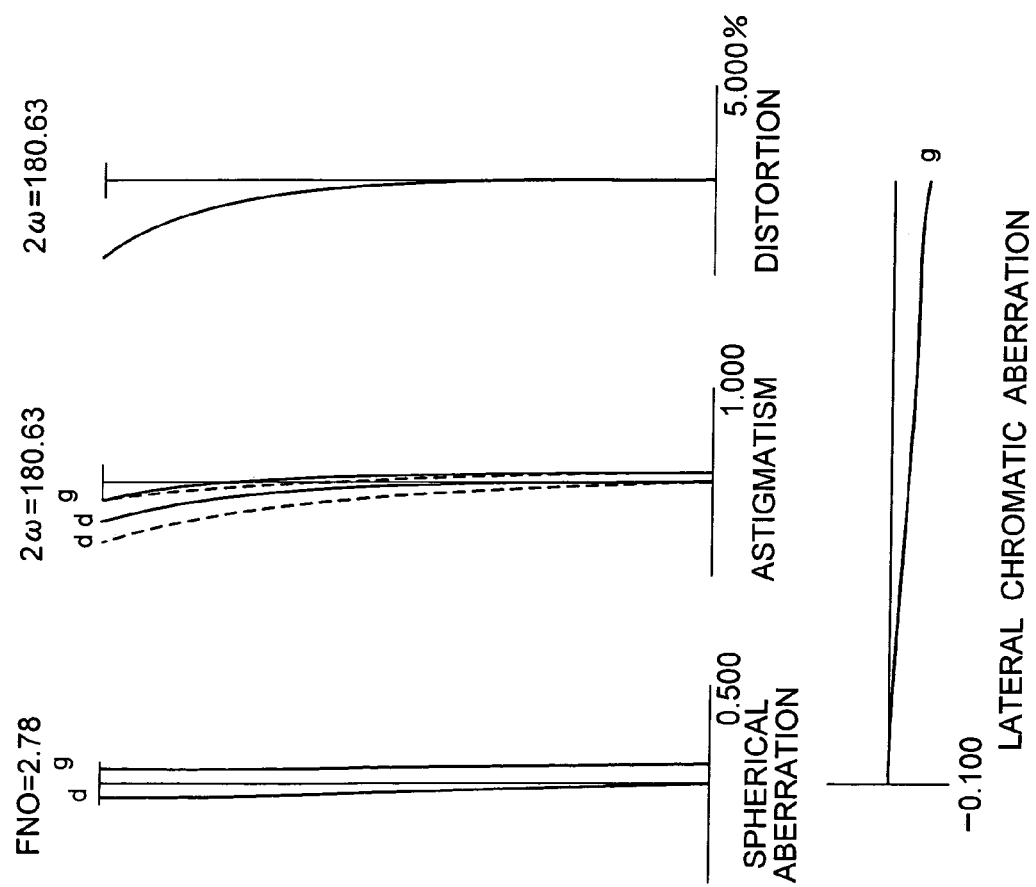
FIG. 4 graphically shows various aberrations of the fisheye lens according to Example 2 and Example 16 of the present invention.

A fisheye lens according to Example 2 of the first embodiment shown in FIG. 3 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double concave shape, and a fourth lens component L4 being a cemented positive lens component constructed by a positive lens element cemented with a negative lens element. The rear lens group G2 is composed of, in order from the object, a fifth lens component L5 having a positive meniscus shape with a stronger convex surface facing to an image, a sixth lens component L6 being a cemented negative lens component constructed by a negative lens element cemented with a positive lens element, and a seventh lens component L7 having a double convex shape with positive refractive power.

Various values associating Example 2 are shown in Table 2.

TABLE 2

(Specification)

| | |
|---|---|
| f = | 10.5 |
| FNO = | 2.8 |
| 2$\omega$ = | 180.6 |
| Bf = | 38.0 |
| TL = | 102.0 |

TABLE 2-continued (Lens Data)

| Surface Number | r | d | νd | nd |
|---|---|---|---|---|
| 1 | 85.122 | 2.50 | 55.52 | 1.69680 |
| 2 | 16.625 | 9.29 | | 1.00000 |
| 3 | 208.221 | 1.00 | 60.29 | 1.62041 |
| 4 | 28.271 | 17.17 | | 1.00000 |
| 5 | −284.146 | 1.00 | 60.09 | 1.64000 |
| 6 | 14.288 | 1.50 | | 1.00000 |
| 7 | 18.690 | 3.93 | 35.3 | 1.59270 |
| 8 | −12.457 | 1.00 | 39.59 | 1.80440 |
| 9 | −26.857 | 6.33 | | 1.00000 |
| 10 | S | 4.69 | | 1.00000 |
| 11 | ∞ | 1.00 | 64.14 | 1.51633 |
| 12 | ∞ | 2.47 | | 1.00000 |
| 13 | −196.193 | 2.15 | 48.87 | 1.53172 |
| 14 | −27.112 | 1.00 | | 1.00000 |
| 15 | −179.223 | 1.00 | 25.43 | 1.80518 |
| 16 | 24.353 | 4.07 | 81.61 | 1.49700 |
| 17 | −32.401 | 0.10 | | 1.00000 |
| 18 | 40.920 | 3.82 | 70.24 | 1.48749 |
| 19 | −43.401 | Bf | | 1.00000 |

(Values for the conditional expressions)

(1) Σd/f = 6.095
(2) f2/f = 2.572
(3) d1/f = 1.380
(4) νRP − νRN = 41.48
(5) nRN − nRP = 0.299

EXAMPLE 3

Figure 5:
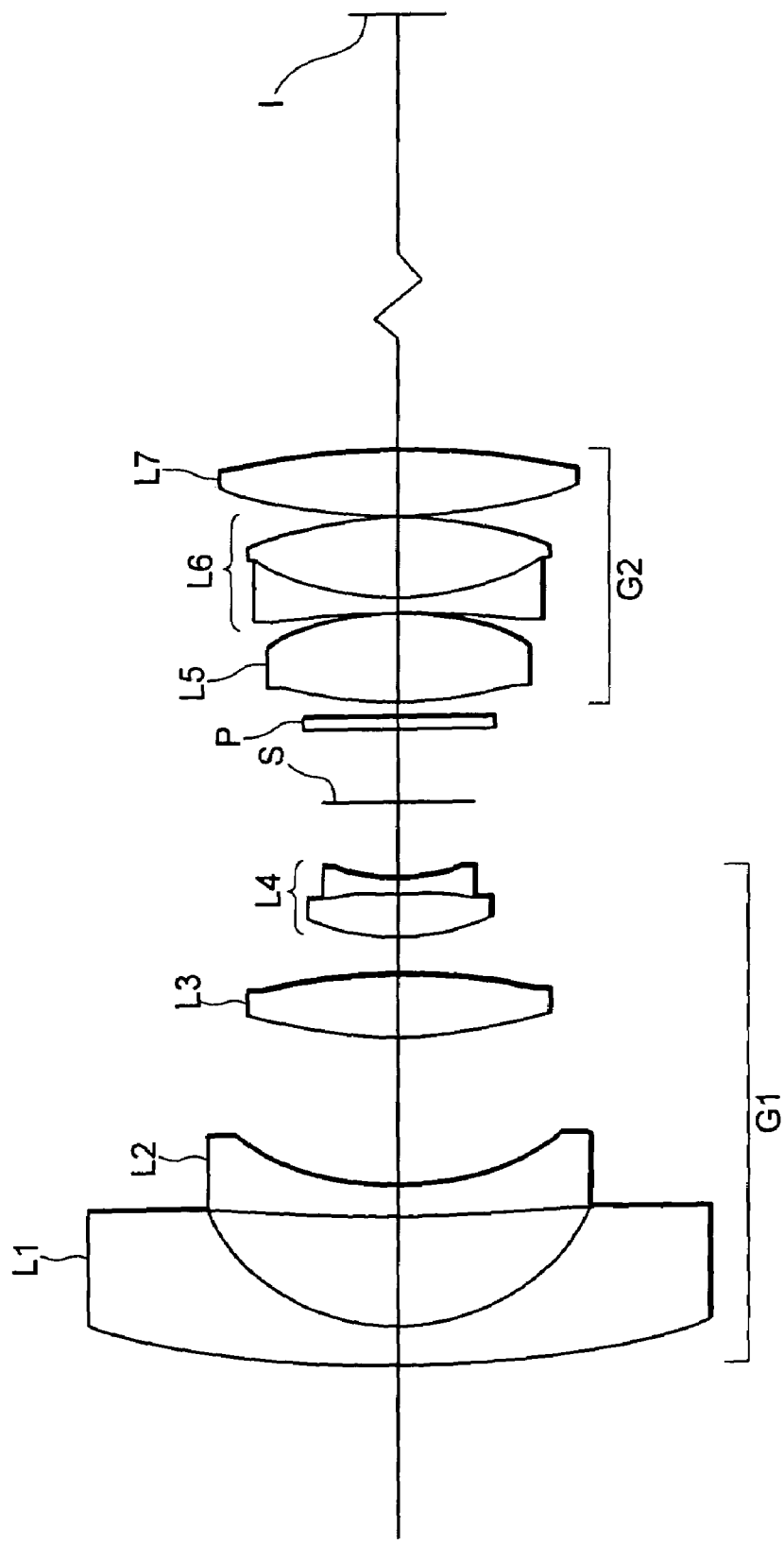
FIG. 5 is a sectional view showing the lens arrangement of a fisheye lens according to Example 3 of the first embodiment and Example 17 of the third embodiment of the present invention.
Figure 6:
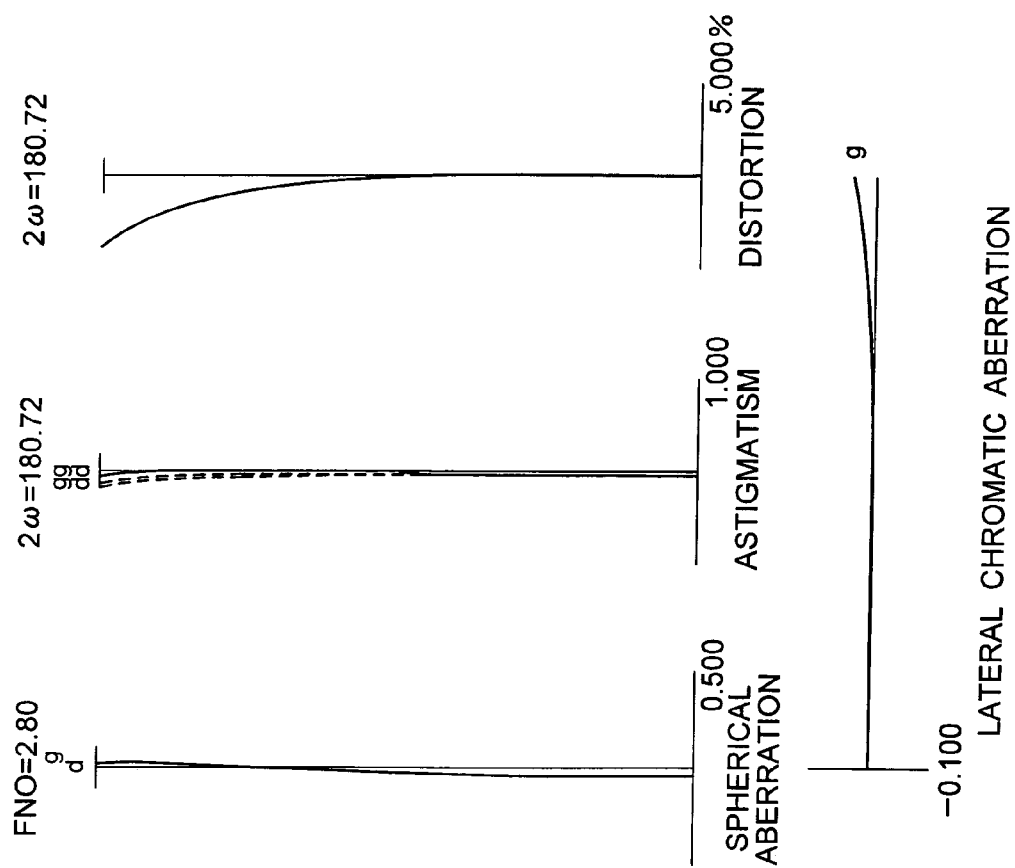
FIG. 6 graphically shows various aberrations of the fisheye lens according to Example 3 and Example 17 of the present invention.

A fisheye lens according to Example 3 of the first embodiment shown in FIG. 5 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double convex shape with positive refractive power, and a fourth lens component L4 being a cemented negative lens component constructed by a positive lens element cemented with a negative lens element. The rear lens group G2 is composed of, in order from the object, a fifth lens component L5 having a double convex shape with positive refractive power, a sixth lens component L6 being a cemented negative lens component constructed by a negative lens element cemented with a positive lens element, and a seventh lens component L7 having a double convex shape with positive refractive power.

Various values associating Example 3 are shown in Table 3.

TABLE 3

(Specification)

| | |
|---|---|
| f = | 10.5 |
| FNO = | 2.8 |
| 2ω = | 180.7 |
| Bf = | 38.0 |
| TL = | 100.0 |

TABLE 3-continued (Lens Data)

| Surface Number | r | d | νd | nd |
|---|---|---|---|---|
| 1 | 84.102 | 2.50 | 46.63 | 1.81600 |
| 2 | 14.531 | 7.29 | | 1.00000 |
| 3 | 166.427 | 2.00 | 49.61 | 1.77250 |
| 4 | 18.949 | 10.23 | | 1.00000 |
| 5 | 31.103 | 4.13 | 25.43 | 1.80518 |
| 6 | −43.681 | 2.68 | | 1.00000 |
| 7 | 15.055 | 2.99 | 52.42 | 1.51742 |
| 8 | −31.790 | 1.00 | 42.72 | 1.83481 |
| 9 | 10.752 | 5.29 | | 1.00000 |
| 10 | S | 4.83 | | 1.00000 |
| 11 | ∞ | 1.00 | 64.14 | 1.51633 |
| 12 | ∞ | 1.00 | | 1.00000 |
| 13 | 34.823 | 6.00 | 70.24 | 1.48749 |
| 14 | −16.988 | 0.15 | | 1.00000 |
| 15 | −52.806 | 1.00 | 37.17 | 1.83400 |
| 16 | 18.437 | 5.30 | 70.24 | 1.48749 |
| 17 | −24.894 | 0.10 | | 1.00000 |
| 18 | 33.005 | 4.51 | 81.61 | 1.49700 |
| 19 | −49.526 | Bf | | 1.00000 |

(Values for the conditional expressions)

(1) Σd/f = 5.905
(2) f2/f = 2.006
(3) d1/f = 1.155
(4) νRP − νRN = 36.86
(5) nRN − nRP = 0.343

EXAMPLE 4

Figure 7:
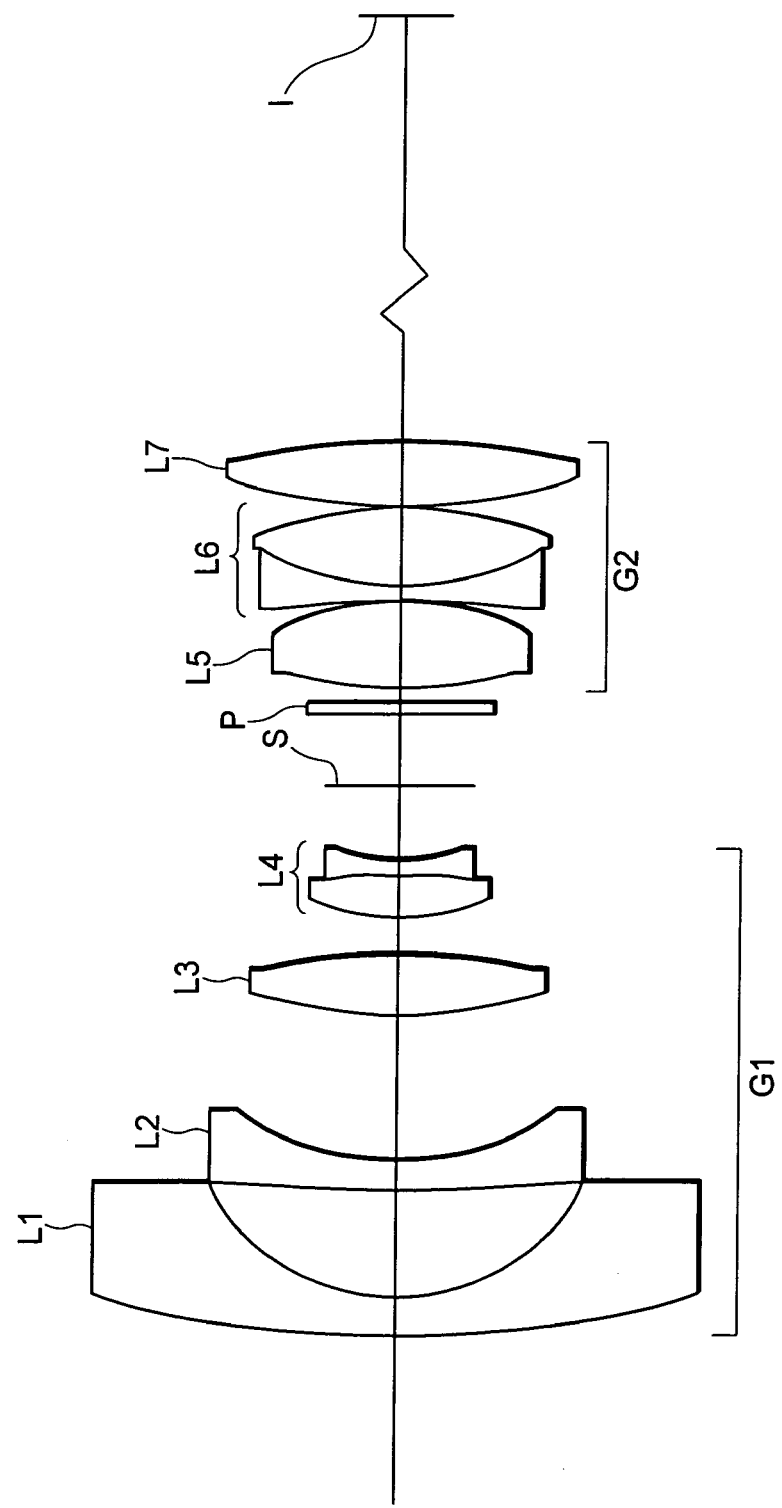
FIG. 7 is a sectional view showing the lens arrangement of a fisheye lens according to Example 4 of the first embodiment and Example 18 of the third embodiment of the present invention.
Figure 8:
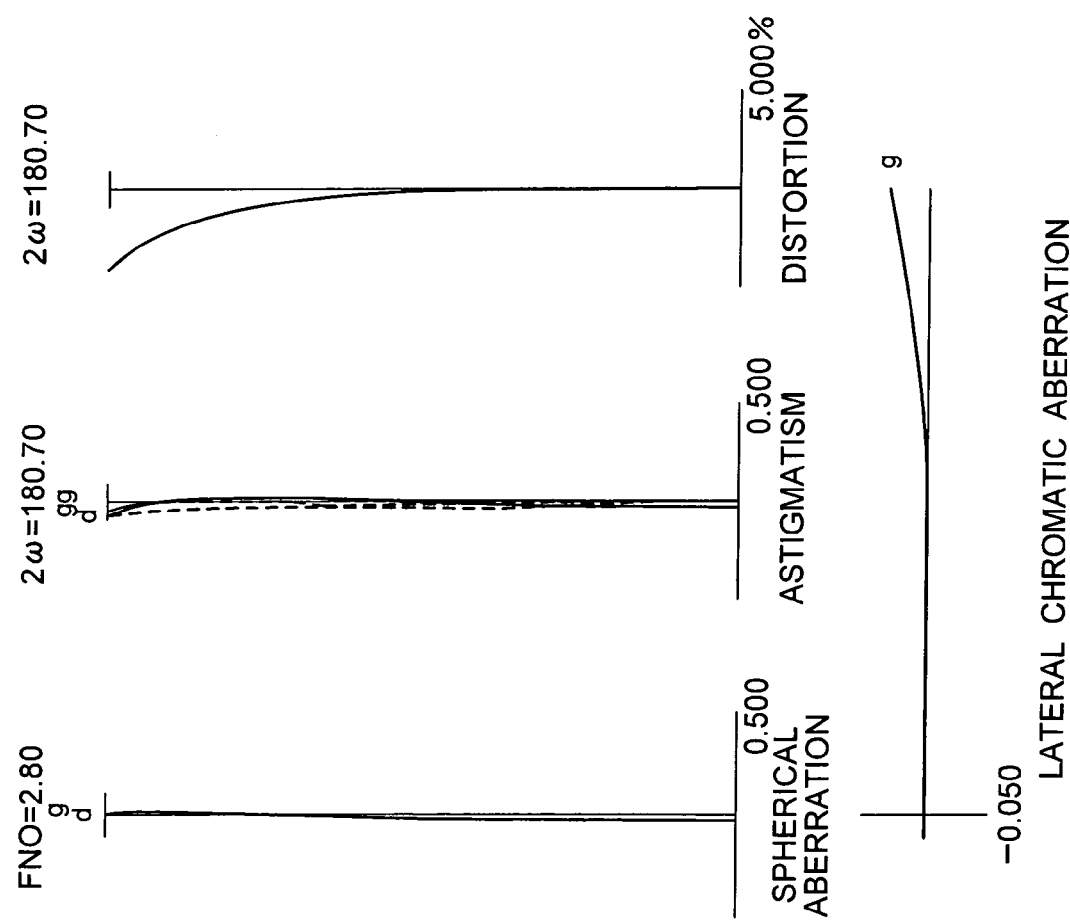
FIG. 8 graphically shows various aberrations of the fisheye lens according to Example 4 and Example 18 of the present invention.

A fisheye lens according to Example 4 of the first embodiment shown in FIG. 7 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double convex shape with positive refractive power, and a fourth lens component L4 being a cemented negative lens component constructed by a positive lens element cemented with a negative lens element. The rear lens group G2 is composed of, in order from the object, a fifth lens component L5 having a double convex shape, a sixth lens component L6 being a cemented negative lens component constructed by a negative lens element cemented with a positive lens element, and a seventh lens component L7 having a double convex shape with positive refractive power.

Various values associating Example 4 are shown in Table 4.

TABLE 4

(Specification)

| | |
|---|---|
| f = | 10.5 |
| FNO = | 2.8 |
| 2ω = | 180.7 |
| Bf = | 37.4 |
| TL = | 99.4 |

TABLE 4-continued (Lens Data)

| Surface Number | r | d | νd | nd |
|---|---|---|---|---|
| 1 | 82.344 | 2.500 | 46.63 | 1.81600 |
| 2 | 14.141 | 7.295 | | 1.00000 |
| 3 | 174.256 | 2.000 | 49.61 | 1.77250 |
| 4 | 20.126 | 10.227 | | 1.00000 |
| 5 | 31.775 | 4.130 | 25.43 | 1.80518 |
| 6 | −45.533 | 2.679 | | 1.00000 |
| 7 | 13.721 | 2.994 | 52.42 | 1.51742 |
| 8 | −43.798 | 1.000 | 42.72 | 1.83481 |
| 9 | 10.077 | 5.293 | | 1.00000 |
| 10 | S | 4.831 | | 1.00000 |
| 11 | ∞ | 1.000 | 64.14 | 1.51633 |
| 12 | ∞ | 1.000 | | 1.00000 |
| 13 | 37.218 | 6.000 | 70.24 | 1.48749 |
| 14 | −16.168 | 0.150 | | 1.00000 |
| 15 | −50.683 | 1.000 | 37.17 | 1.83400 |
| 16 | 18.476 | 5.296 | 70.24 | 1.48749 |
| 17 | −24.785 | 0.100 | | 1.00000 |
| 18 | 31.496 | 4.507 | 81.61 | 1.49700 |
| 19 | −53.726 | Bf | | 1.00000 |

(Values for the conditional expressions)

(1) Σd/f = 5.905
(2) f2/f = 2.000
(3) d1/f = 1.155
(4) νRP − νRN = 36.86
(5) nRN − nRP = 0.343

EXAMPLE 5

Figure 9:
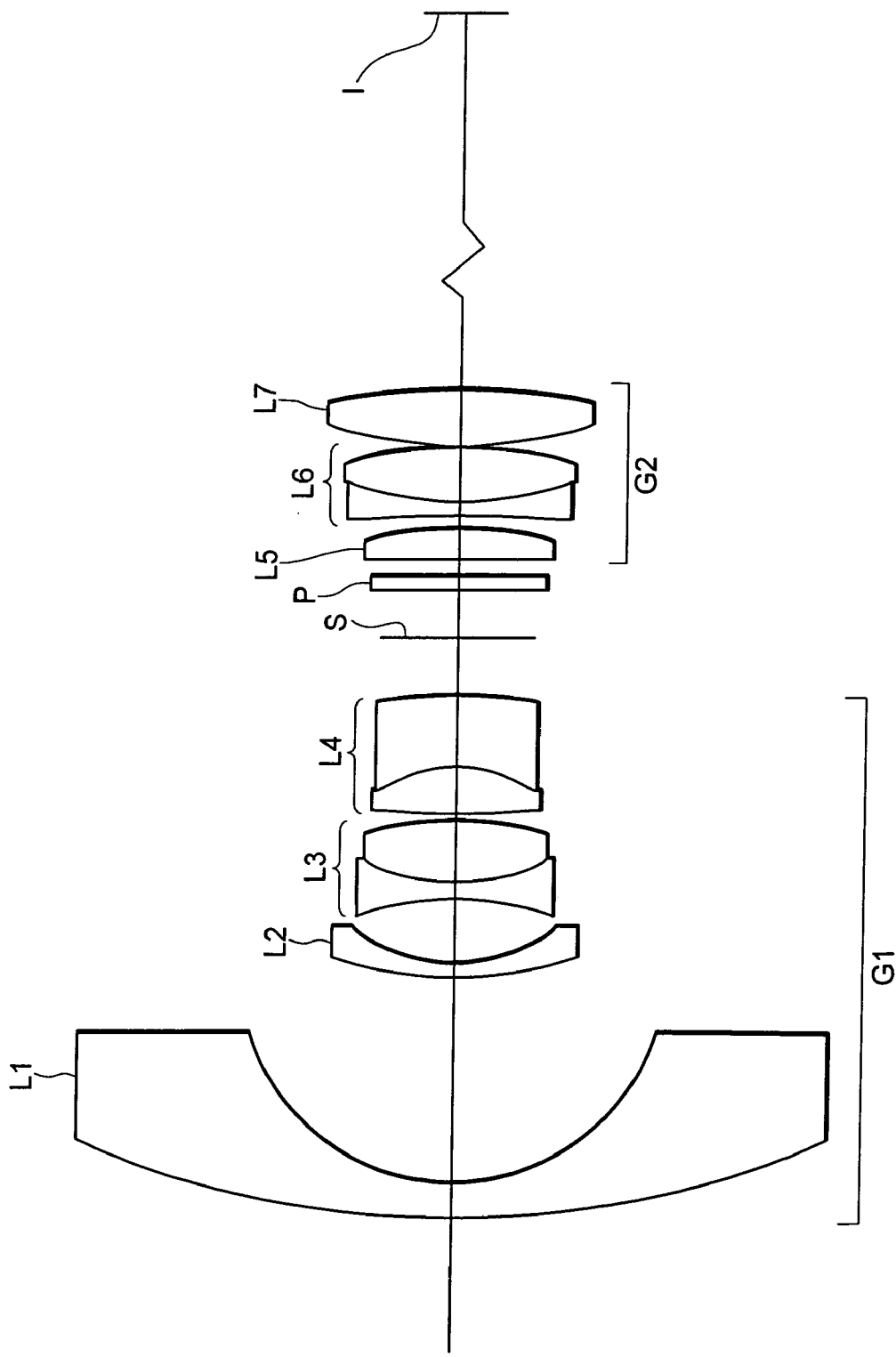
FIG. 9 is a sectional view showing the lens arrangement of a fisheye lens according to Example 5 of the first embodiment and Example 11 of a second embodiment of the present invention.
Figure 10:
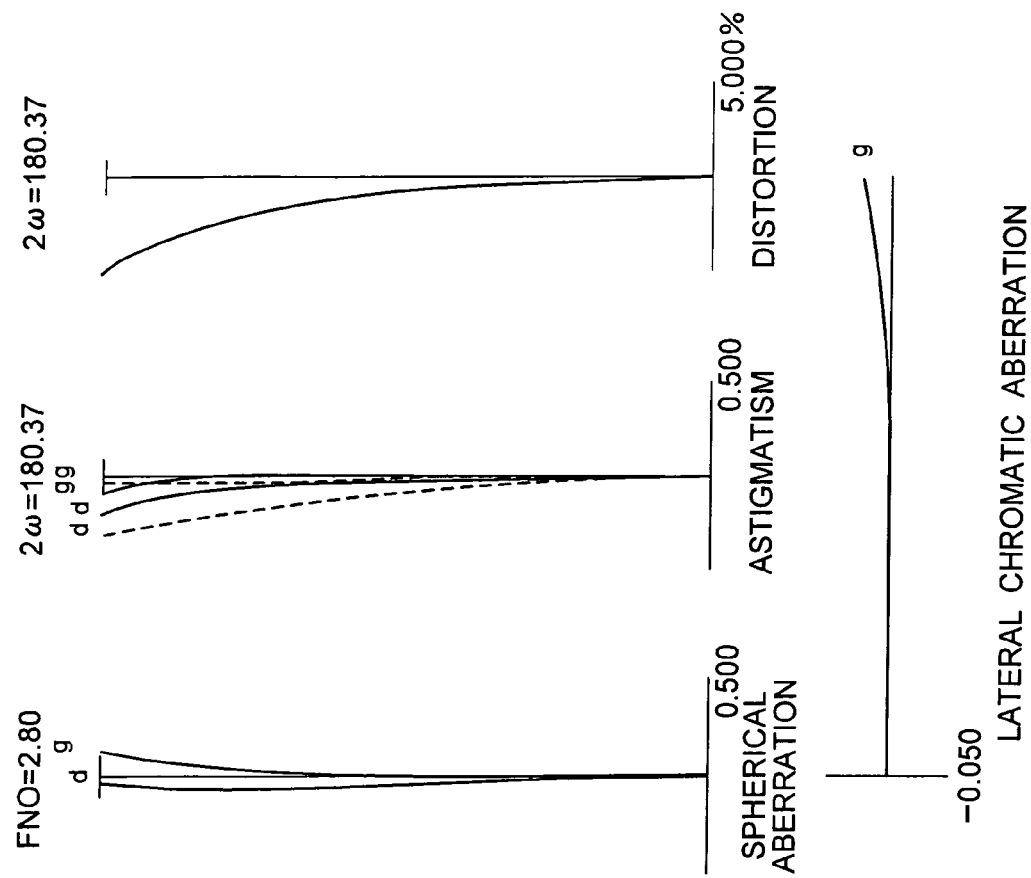
FIG. 10 graphically shows various aberrations of the fisheye lens according to Example 5 and Example 11 of the present invention.

A fisheye lens according to Example 5 of the first embodiment shown in FIG. 9 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, and a fourth lens component L4 being a cemented positive lens component constructed by a positive lens element cemented with a negative lens element. The rear lens group G2 is composed of, in order from the object, a fifth lens component L5 having a double convex shape with positive refractive power, a sixth lens component L6 being a cemented negative lens component constructed by a negative lens element cemented with a positive lens element, and a seventh lens component L7 having a double convex shape with positive refractive power.

Various values associating Example 5 are shown in Table 5.

TABLE 5

(Specification)

| | |
|---|---|
| f = | 10.5 |
| FNO = | 2.8 |
| 2ω = | 180.4 |
| Bf = | 38.0 |
| TL = | 102.0 |

TABLE 5-continued (Lens Data)

| Surface Number | r | d | νd | nd |
|---|---|---|---|---|
| 1 | 72.411 | 2.50 | 60.68 | 1.60311 |
| 2 | 15.735 | 15.92 | | 1.00000 |
| 3 | 28.617 | 1.00 | 60.09 | 1.64000 |
| 4 | 12.674 | 4.85 | | 1.00000 |
| 5 | −23.498 | 1.35 | 60.09 | 1.64000 |
| 6 | 14.527 | 4.91 | 35.3 | 1.59270 |
| 7 | −25.302 | 0.50 | | 1.00000 |
| 8 | 79.663 | 3.50 | 35.3 | 1.59270 |
| 9 | −11.788 | 5.58 | 40.77 | 1.88300 |
| 10 | −52.783 | 4.69 | | 1.00000 |
| 11 | S | 3.75 | | 1.00000 |
| 12 | ∞ | 1.00 | 64.14 | 1.51633 |
| 13 | ∞ | 1.41 | | 1.00000 |
| 14 | 1042.319 | 2.33 | 70.24 | 1.48749 |
| 15 | −25.279 | 1.00 | | 1.00000 |
| 16 | −134.056 | 1.00 | 25.43 | 1.80518 |
| 17 | 23.381 | 4.31 | 52.42 | 1.51742 |
| 18 | −30.241 | 0.10 | | 1.00000 |
| 19 | 32.329 | 4.30 | 70.24 | 1.48749 |
| 20 | −48.237 | Bf | | 1.00000 |

(Values for the conditional expressions)

(1) Σd/f = 6.096
(2) f2/f = 2.281
(3) d1/f = 1.033
(4) νRP − νRN = 38.87
(5) nRN − nRP = 0.308

EXAMPLE 6

Figure 11:
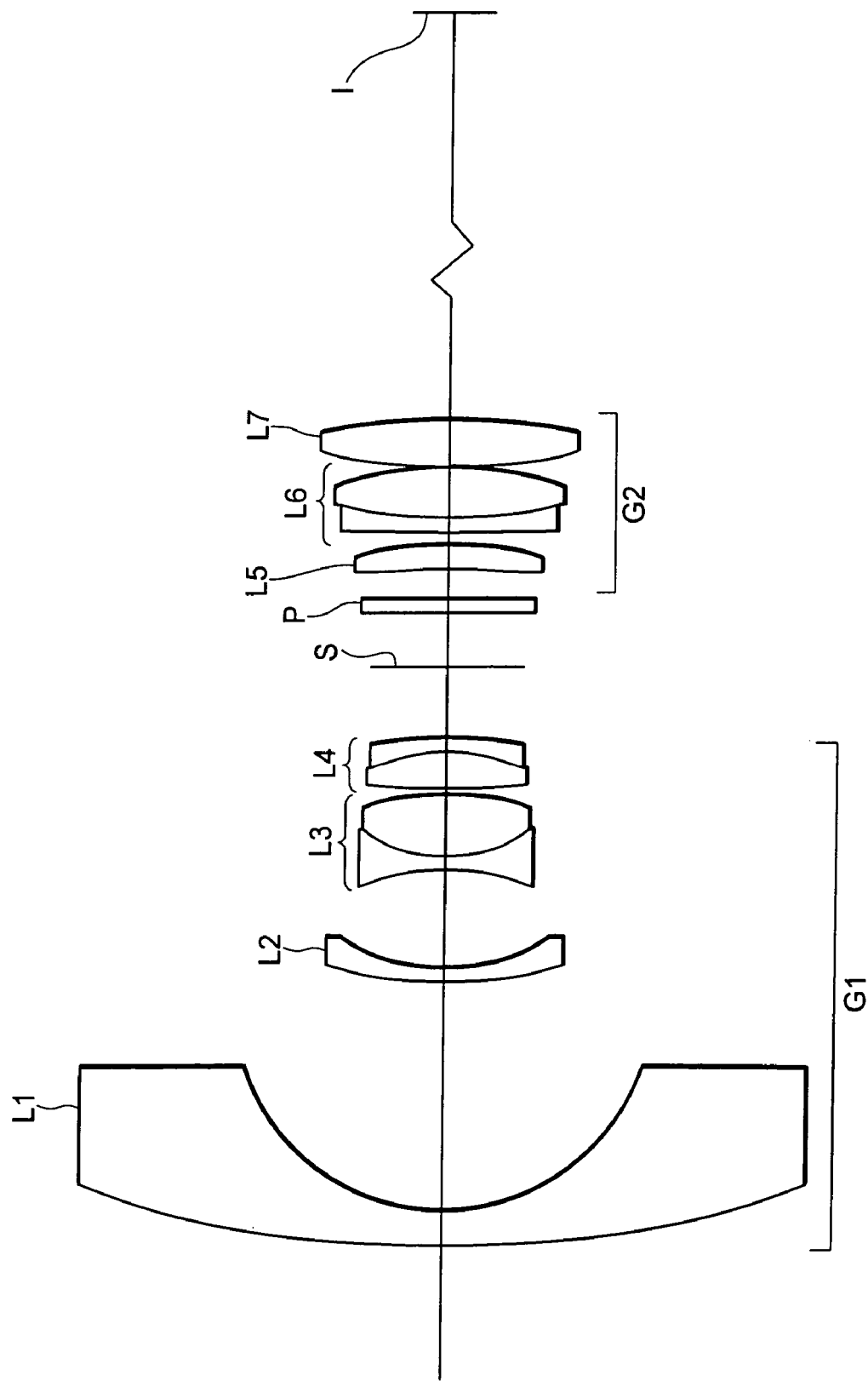
FIG. 11 is a sectional view showing the lens arrangement of a fisheye lens according to Example 6 of the first embodiment and Example 12 of the second embodiment of the present invention.
Figure 12:
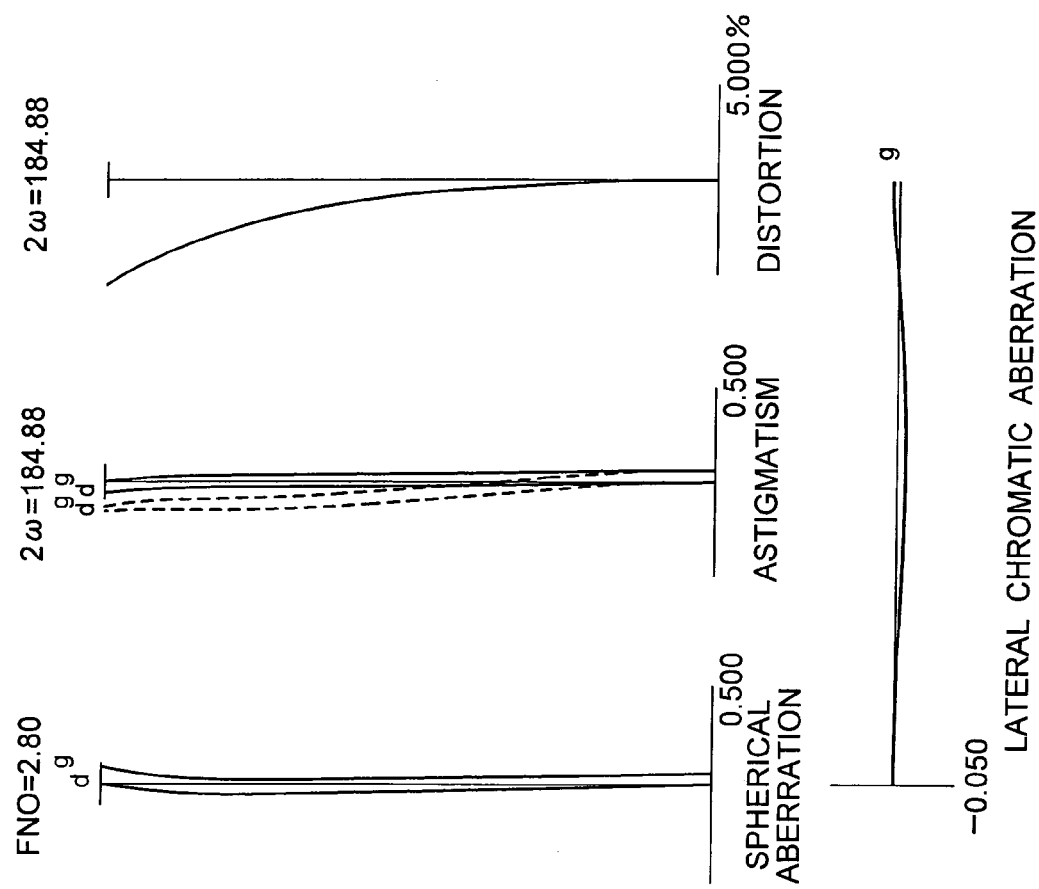
FIG. 12 graphically shows various aberrations of the fisheye lens according to Example 6 and Example 12 of the present invention.

A fisheye lens according to Example 6 of the first embodiment shown in FIG. 11 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, and a fourth lens component L4 being a cemented positive lens component constructed by a positive lens element cemented with a negative lens element. The rear lens group G2 is composed of, in order from the object, a fifth lens component L5 having positive refractive power and a positive meniscus shape with a stronger convex surface facing to an image, a sixth lens component L6 being a cemented positive lens component constructed by a negative lens element cemented with a positive lens element, and a seventh lens component L7 having a double convex shape.

Various values associating Example 6 are shown in Table 6.

TABLE 6

(Specification)

| | |
|---|---|
| f = | 10.5 |
| FNO = | 2.8 |
| 2ω = | 184.9 |
| Bf = | 38.0 |
| TL = | 102.0 |

TABLE 6-continued (Lens Data)

| Surface Number | r | d | vd | nd |
|---|---|---|---|---|
| 1 | 88.456 | 2.50 | 63.38 | 1.61800 |
| 2 | 15.969 | 17.68 | | 1.00000 |
| 3 | 30.019 | 1.00 | 46.58 | 1.80400 |
| 4 | 14.663 | 7.68 | | 1.00000 |
| 5 | −19.270 | 1.00 | 63.38 | 1.61800 |
| 6 | 10.973 | 4.91 | 35.3 | 1.59270 |
| 7 | −21.519 | 0.50 | | 1.00000 |
| 8 | 93.372 | 2.77 | 52.42 | 1.51742 |
| 9 | −14.476 | 1.00 | 42.72 | 1.83481 |
| 10 | −35.244 | 5.71 | | 1.00000 |
| 11 | S | 4.36 | | 1.00000 |
| 12 | ∞ | 1.00 | 64.14 | 1.51633 |
| 13 | ∞ | 2.29 | | 1.00000 |
| 14 | −82.227 | 1.94 | 81.61 | 1.49700 |
| 15 | −28.439 | 1.00 | | 1.00000 |
| 16 | 424.857 | 1.00 | 23.78 | 1.84666 |
| 17 | 29.343 | 3.90 | 81.61 | 1.49700 |
| 18 | −30.672 | 0.10 | | 1.00000 |
| 19 | 39.192 | 3.68 | 70.24 | 1.48749 |
| 20 | −52.057 | Bf | | 1.00000 |

(Values for the conditional expressions)

(1) Σd/f = 6.095
(2) f2/f = 2.477
(3) d1/f = 1.271
(4) νRP − νRN = 54.04
(5) nRN − nRP = 0.353

EXAMPLE 7

Figure 13:
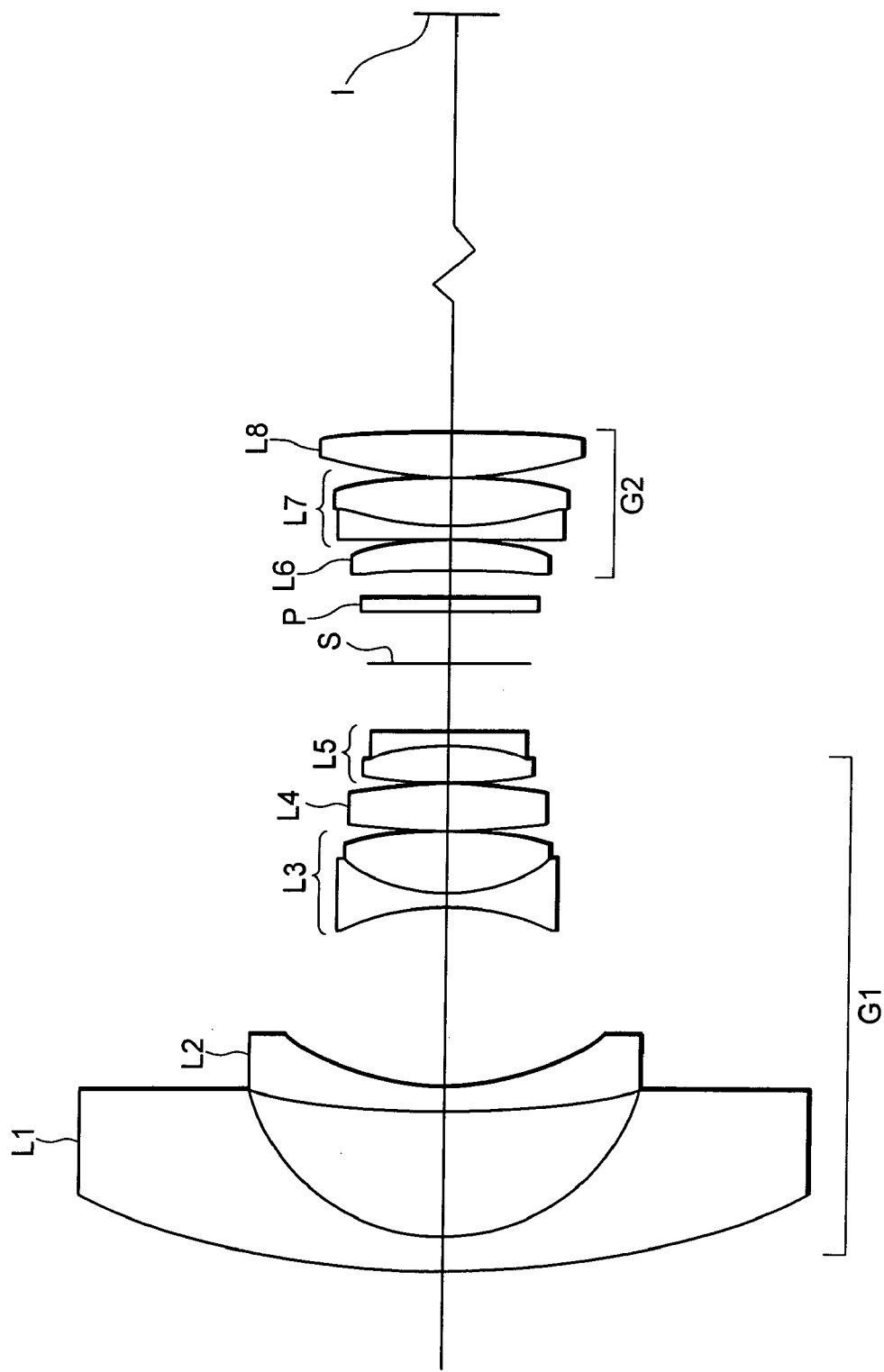
FIG. 13 is a sectional view showing the lens arrangement of a fisheye lens according to Example 7 of the first embodiment and Example 13 of the second embodiment of the present invention.
Figure 14:
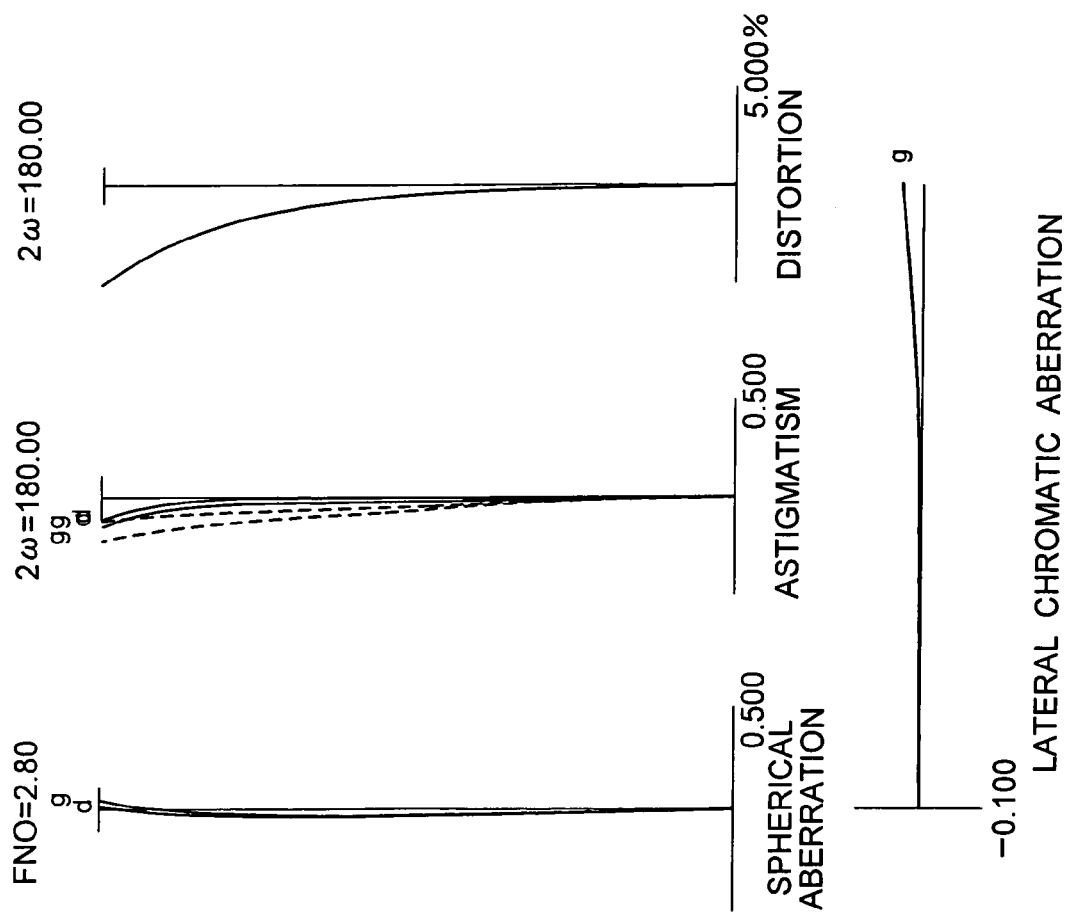
FIG. 14 graphically shows various aberrations of the fisheye lens according to Example 7 and Example 13 of the present invention.

A fisheye lens according to Example 7 of the first embodiment shown in FIG. 13 cosists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, a fourth lens component L4 having a double convex shape with positive refractive power, and a fifth lens component L5 being a cemented negative lens component constructed by a positive lens element cemented with a negative lens element. The rear lens group G2 is composed of, in order from the object, a sixth lens component L6 having positive refractive power and a positive meniscus shape with a stronger convex surface facing to an image, a seventh lens component L7 being a cemented positive lens component constructed by a negative lens element cemented with a positive lens element, and an eighth lens component L8 having a double convex shape with positive refractive power.

Various values associating Example 7 are shown in Table 7.

TABLE 7

(Specification)

f = 10.5
FNO = 2.8
2ω = 180.0
Bf = 38.0
TL = 102.0

(Lens Data)

| Surface Number | r | d | vd | nd |
|---|---|---|---|---|
| 1 | 72.031 | 2.50 | 63.38 | 1.61800 |
| 2 | 15.316 | 9.37 | | 1.00000 |
| 3 | 71.220 | 2.00 | 46.58 | 1.80400 |
| 4 | 21.254 | 13.56 | | 1.00000 |
| 5 | −19.566 | 1.00 | 63.38 | 1.61800 |
| 6 | 12.221 | 4.89 | 35.3 | 1.59270 |
| 7 | −29.281 | 0.10 | | 1.00000 |
| 8 | 115.189 | 3.41 | 35.3 | 1.59270 |
| 9 | −35.850 | 0.10 | | 1.00000 |
| 10 | 38.990 | 2.97 | 54.68 | 1.51454 |
| 11 | −16.347 | 1.00 | 42.72 | 1.83481 |
| 12 | 128.223 | 5.85 | | 1.00000 |
| 13 | S | 4.09 | | 1.00000 |
| 14 | ∞ | 1.00 | 64.14 | 1.51633 |
| 15 | ∞ | 2.09 | | 1.00000 |
| 16 | −87.929 | 2.30 | 81.61 | 1.49700 |
| 17 | −23.390 | 0.10 | | 1.00000 |
| 18 | 252.650 | 1.00 | 25.43 | 1.80518 |
| 19 | 27.543 | 3.68 | 81.61 | 1.49700 |
| 20 | −36.636 | 0.10 | | 1.00000 |
| 21 | 33.519 | 3.36 | 81.61 | 1.49700 |
| 22 | −95.905 | Bf | | 1.00000 |

(Values for the conditional expressions)

(1) Σd/f = 6.095
(2) f2/f = 2.369
(3) d1/f = 1.241
(4) νRP − νRN = 56.18
(5) nRN − nRP = 0.308

EXAMPLE 8

Figure 15:
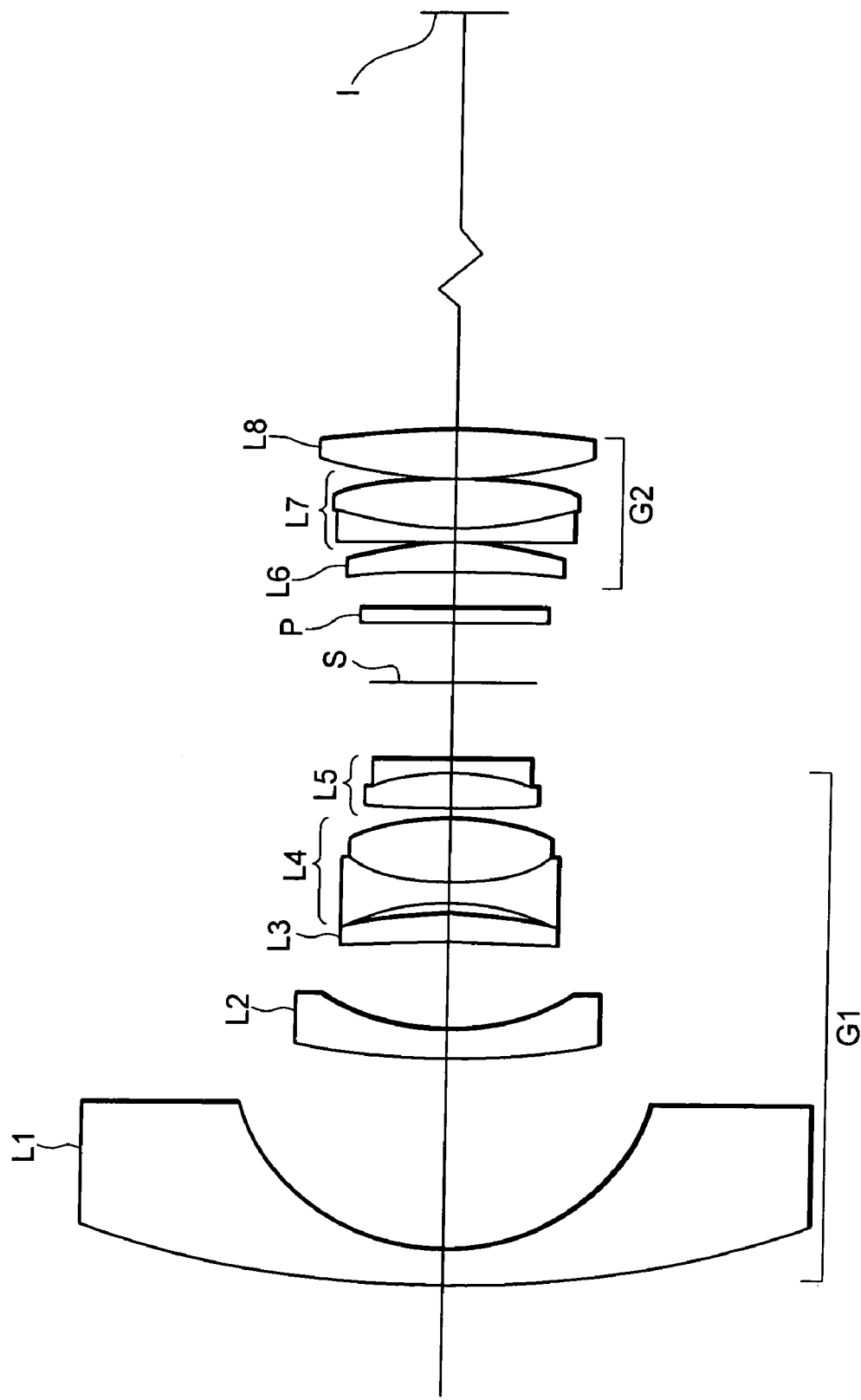
FIG. 15 is a sectional view showing the lens arrangement of a fisheye lens according to Example 8 of the first embodiment and Example 14 of the second embodiment of the present invention.
Figure 16:
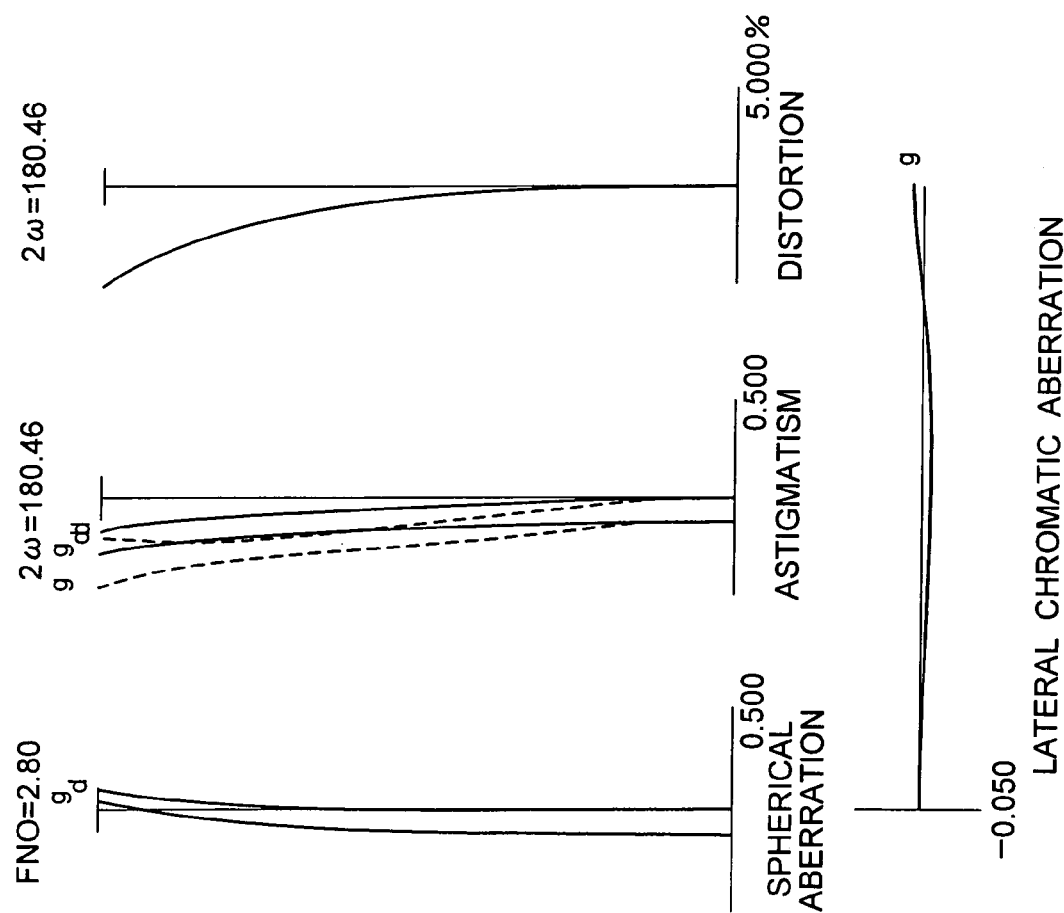
FIG. 16 graphically shows various aberrations of the fisheye lens according to Example 8 and Example 14 of the present invention.

A fisheye lens according to Example 8 of the first embodiment shown in FIG. 15 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a positive meniscus shape with a stronger convex surface facing to an image with positive refractive power, a fourth lens component L4 being a cemented positive lens component constructed by a negative lens element cemented with a positive lens element, and a fifth lens component L5 being a cemented negative lens component constructed by a positive lens element cemented with a negative lens element. The rear lens group G2 is composed of, in order from the object, a sixth lens component L6 having positive refractive power and a positive meniscus shape with a stronger convex surface facing to the image, a seventh lens component L7 being a cemented positive lens component constructed by a negative lens element cemented with a positive lens element, and an eighth lens component L8 having a double convex shape with positive refractive power.

Various values associating Example 8 are shown in Table 8.

TABLE 8

(Specification)

| | |
|---|---|
| f = | 10.5 |
| FNO = | 2.8 |
| 2ω = | 180.5 |
| Bf = | 38.0 |
| TL = | 102.0 |

(Lens Data)

| Surface Number | r | d | νd | nd |
|---|---|---|---|---|
| 1 | 85.910 | 2.50 | 63.38 | 1.61800 |
| 2 | 15.764 | 14.28 | | 1.00000 |
| 3 | 64.782 | 2.00 | 46.58 | 1.80400 |
| 4 | 16.343 | 6.61 | | 1.00000 |
| 5 | −229.828 | 2.12 | 35.3 | 1.59270 |
| 6 | −29.589 | 0.85 | | 1.00000 |
| 7 | −16.981 | 1.50 | 63.38 | 1.61800 |
| 8 | 15.576 | 4.91 | 35.3 | 1.59270 |
| 9 | −17.821 | 0.64 | | 1.00000 |
| 10 | 73.809 | 2.81 | 52.42 | 1.51742 |
| 11 | −14.406 | 1.00 | 42.72 | 1.83481 |
| 12 | −87.316 | 5.74 | | 1.00000 |
| 13 | S | 4.48 | | 1.00000 |
| 14 | ∞ | 1.00 | 64.14 | 1.51633 |
| 15 | ∞ | 2.96 | | 1.00000 |
| 16 | −84.470 | 2.17 | 81.61 | 1.49700 |
| 17 | −24.565 | 0.10 | | 1.00000 |
| 18 | 327.100 | 1.00 | 23.78 | 1.84666 |
| 19 | 30.097 | 3.80 | 81.61 | 1.49700 |
| 20 | −32.410 | 0.10 | | 1.00000 |
| 21 | 36.747 | 3.42 | 70.24 | 1.48749 |
| 22 | −78.411 | Bf | | 1.00000 |

(Values for the conditional expressions)

(1) Σd/f = 6.090
(2) f2/f = 2.423
(3) d1/f = 1.349
(4) νRP − νRN = 52.39
(5) nRN − nRP = 0.308

EXAMPLE 9

Figure 17:
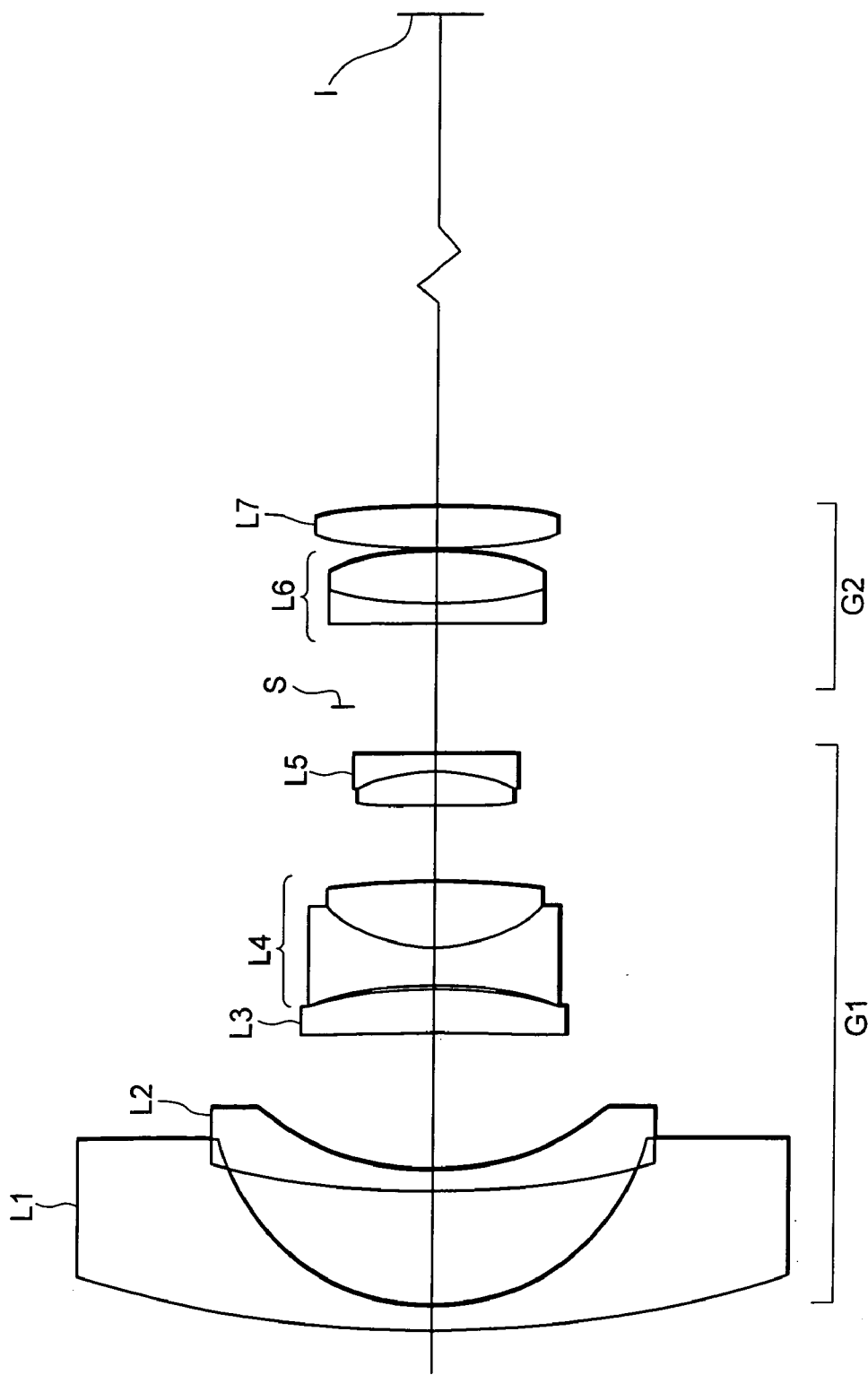
FIG. 17 is a sectional view showing the lens arrangement of a fisheye lens according to Example 9 of the first embodiment of the present invention.
Figure 18:
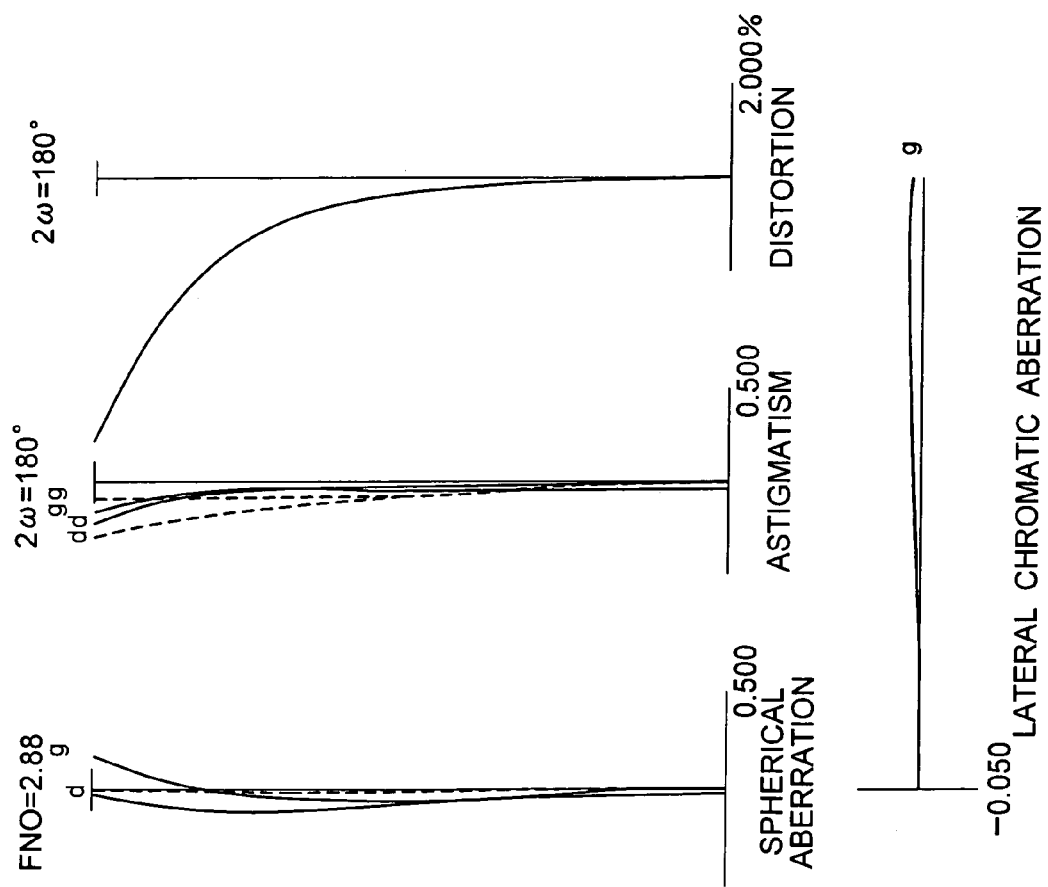
FIG. 18 graphically shows various aberrations of the fisheye lens according to Example 9 of the present invention.

A fisheye lens according to Example 9 of the first embodiment shown in FIG. 17 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having positive refractive power and a positive meniscus shape with a convex surface toward an image, a fourth lens component L4 being a cemented negative lens component constructed by a negative lens element cemented with a positive lens element, and a fifth lens component L5 being a cemented negative lens component constructed by a positive lens element cemented with a negative lens element. The rear lens group G2 is composed of, in order from the object, a sixth lens component L6 being a cemented positive lens component constructed by a negative lens element cemented with a positive lens element, and a seventh lens component L7 having a double convex shape with positive refractive power.

Various values associating Example 9 are shown in Table 9.

TABLE 9

(Specification)

| | |
|---|---|
| f = | 10.56 |
| FNO = | 2.88 |
| 2ω = | 180 |
| Bf = | 41.1 |
| TL = | 103.7 |

(Lens Data)

| Surface Number | r | d | νd | nd |
|---|---|---|---|---|
| 1 | 85.00 | 2.040 | 60.29 | 1.62041 |
| 2 | 16.45 | 8.320 | | 1.00000 |
| 3 | 61.18 | 1.700 | 46.63 | 1.816 |
| 4 | 20.15 | 10.316 | | 1.00000 |
| 5 | −204.00 | 3.430 | 43.69 | 1.72 |
| 6 | −31.26 | 0.250 | | 1.00000 |
| 7 | −27.00 | 2.780 | 49.61 | 1.7725 |
| 8 | 11.48 | 4.930 | 28.46 | 1.72825 |
| 9 | −55.84 | 5.865 | | 1.00000 |
| 10 | 59.67 | 2.570 | 52.42 | 1.51742 |
| 11 | −14.20 | 1.410 | 42.72 | 1.83481 |
| 12 | −76.00 | 3.660 | | 1.00000 |
| 13 | S | 8.776 | | 1.00000 |
| 14 | −1732.00 | 1.490 | 23.78 | 1.84666 |
| 15 | 29.90 | 4.020 | 81.61 | 1.497 |
| 16 | −21.55 | 0.190 | | 1.00000 |
| 17 | 44.74 | 3.210 | 58.54 | 1.6516 |
| 18 | −44.74 | Bf | | 1.00000 |

(Values for the conditional expressions)

(1) Σd/f = 5.930
(2) f2/f = 2.320
(3) d1/f = 0.959
(4) νRP − νRN = 46.300
(5) nRN − nRP = 0.270

EXAMPLE 10

Figure 19:
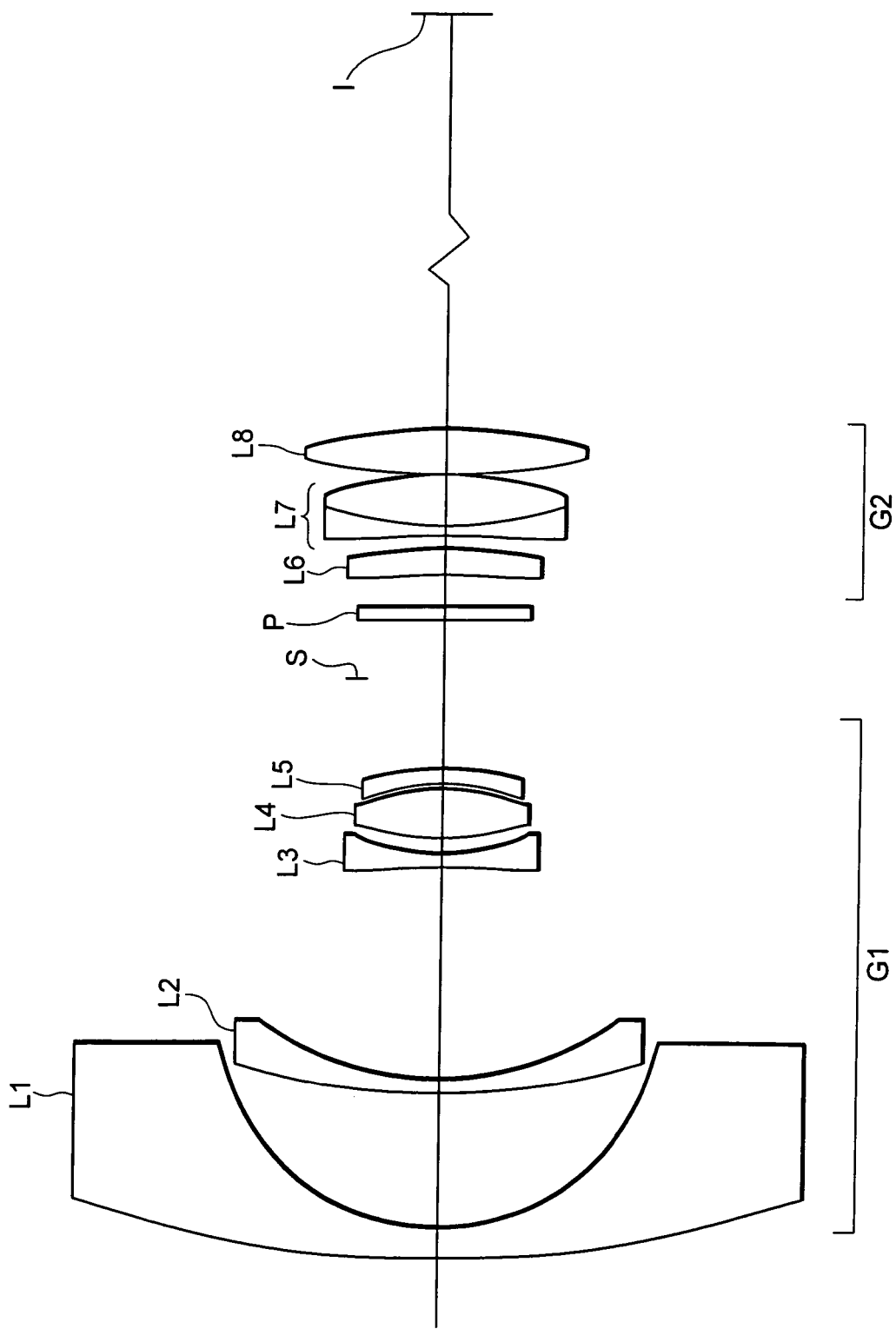
FIG. 19 is a sectional view showing the lens arrangement of a fisheye lens according to Example 10 of the first embodiment of the present invention.

A fisheye lens according to Example 10 of the first embodiment shown in FIG. 19 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double concave shape, and a fourth lens component L4 having a double convex shape, and a fifth lens component L5 having a negative meniscus shape. The rear lens group G2 is composed of, in order from the object, a sixth lens component L6 having a positive meniscus shape with a stronger convex surface facing to an image, a seventh lens component L7 being a cemented positive lens component constructed by a negative lens element cemented with a positive lens element, and an eighth lens component L8 having a double convex shape with positive refractive power.

Various values associating Example 10 are shown in Table 10.

TABLE 10

(Specification)

| | |
|---|---|
| f = | 10.5 |
| FNO = | 2.88 |
| 2ω = | 180 |
| Bf = | 39.0 |
| TL = | 106.0 |

(Lens Data)

| Surface Number | r | d | νd | nd |
|---|---|---|---|---|
| 1 | 91.145 | 2.5 | 55.52 | 1.69680 |
| 2 | 17.807 | 10.7158 | | 1.00000 |
| 3 | 59.308 | 1.00 | 60.29 | 1.62041 |
| 4 | 23.682 | 17.1651 | | 1.00000 |
| 5 | −156.643 | 1.00 | 60.09 | 1.64000 |
| 6 | 15.400 | 1.50 | | 1.00000 |
| 7 | 22.486 | 3.9263 | 35.3 | 1.59270 |
| 8 | −16.177 | 0.2 | | 1.00000 |
| 9 | −15.564 | 1 | 39.59 | 1.80440 |
| 10 | −27.069 | 7.7273 | | 1.00000 |
| 11 | S | 4.6908 | | 1.00000 |
| 12 | ∞ | 1.00 | 64.14 | 1.51633 |
| 13 | ∞ | 2.466 | | 1.00000 |
| 14 | −92.801 | 2.1463 | 48.87 | 1.53172 |
| 15 | −34.586 | 1.00 | | 1.00000 |
| 16 | −227.808 | 1.00 | 25.43 | 1.80518 |
| 17 | 27.770 | 4.0689 | 81.61 | 1.49700 |
| 18 | −29.146 | 0.1 | | 1.00000 |
| 19 | 44.100 | 3.8181 | 70.24 | 1.48749 |
| 20 | −34.128 | Bf | | 1.00000 |

(Values for the conditional expressions)

(1) Σd/f = 6.383
(2) f2/f = 2.572
(3) d1/f = 1.513
(4) νRP − νRN = 41.477
(5) nRN − nRP = 0.299

Second Embodiment

A fisheye lens according to a second embodiment of the present invention is explained below.

A fisheye lens according to the second embodiment of the present invention consists of a front lens group having negative refractive power and a rear lens group having positive refractive power locating with a space along the optical axis apart from the front lens group. The front lens group includes, in order from an object, a plurality of negative lens components, and two cemented lens components. At least one of the two cemented lens components has a negative lens element to the object side thereof and the negative lens element satisfies the following conditional expression (6);

$$1.0 < |R|/f < 4.0 \quad (6)$$

where f denotes the focal length of the fisheye lens and R denotes the radius of curvature of the object side surface of the negative lens element arranged to the object side.

The front lens group has a negative refractive power component having strong divergent effect to deflect light ray entering from a wide incident range of 180 degrees to a direction parallel to the optical axis. By constructing the negative refractive power component of the front lens group with a plurality of negative lens components, aberrations produced thereby can be spread to or shared by the plurality of the negative lens components. Moreover, by arranging two cemented lens components, curvature of field, astigmatism and lateral chromatic aberration produced at the negative lens components can be corrected.

The first cemented lens component arranged to the object side is composed of, in order from the object, a negative lens element having low dispersion and a positive lens element having high dispersion and satisfactory corrects lateral chromatic aberration. The second cemented lens component is composed of, in order from the object, a positive lens element having low refractive index and a negative lens element having high refractive index, satisfactorily corrects axial chromatic aberration, and suppresses production of curvature of field and astigmatism with securing sufficient back focal length.

In the second embodiment, the following conditional expressions (7) through (11) may be preferably further satisfied:

$$4.0 \leq \Sigma d/f \leq 10.0 \quad (7)$$

$$1.5 \leq f2/f \leq 4.0 \quad (8)$$

$$0.5 < d1/f < 2.0 \quad (9)$$

$$30 \leq \nu RP - \nu RN \leq 60 \quad (10)$$

$$0.2 \leq nRN - nRP \leq 0.45 \quad (11)$$

where f denotes the focal length of the fisheye lens, Σd denotes the distance from the most object side lens surface to the most image side lens surface of the fisheye lens when focusing at infinity, f2 denotes the focal length of the rear lens group, d1 denotes the distance along the optical axis between the front lens group and the rear lens group, νRP denotes the mean value of Abbe numbers of the positive lens elements in the lens components in the rear lens group, νRN denotes the mean value of Abbe numbers of the negative lens elements in the lens components in the rear lens group, nRN denotes the mean value of refractive indices of the negative lens elements in the lens components in the rear lens group at d-line (λ=587.6 nm) and nRP denotes the mean value of refractive indices of the positive lens elements in the lens components in the rear lens group at d-line (λ=587.6 nm).

In a fisheye lens according to the second embodiment of the present invention, conditional expression (6) is for controlling the size of the outer diameter of the negative lens component in the front lens group with securing sufficient peripheral quantity of light and back focal length. When the ratio |R|/f is higher than or equal to the upper limit or is less than or equal to the lower limit of conditional expression (6), the back focal length becomes too short to be able to be used for a SLR camera. Moreover, in order to pass light ray entering from a wide incident range of 180 degrees, the diameter (front lens diameter) of the lens locating to the most object side becomes extremely large, so that the whole lens becomes large in size and heavy in weight. In order to obtain good optical performance, it is preferable that the upper and lower limits are set to 3.5 and 1.5, respectively.

In a fisheye lens according to the second embodiment of the present invention, conditional expression (7) is for controlling the whole size and weight of the lens with securing sufficient back focal length and correcting off-axis aberrations. When the ratio Σd/f exceeds the upper limit of conditional expression (7), the back focal length becomes too short to be able to be used for a SLR camera. Moreover, in order to pass light ray entering from a wide incident range of 180 degrees, the diameter (front lens diameter) of the lens locating to the most object side becomes extremely large, so that the whole lens becomes large in size and heavy in weight. In order to obtain good optical performance, it is preferable that the upper limit is set to 8.0. On the other hand, when the ratio Σd/f falls below the lower limit of conditional expression (7), although the back focal length can be secured sufficiently, it becomes difficult to maintain the angle of view of 180 degrees, so that it is undesirable. In order to obtain good optical performance, it is preferable that the lower limit is set to 5.0.

In a fisheye lens according to the second embodiment of the present invention, conditional expression (8) defines an appropriate range of the focal length of the rear lens group with securing sufficient back focal length and correcting off-axis aberrations. When the ratio f2/f exceeds the upper limit of conditional expression (8), it becomes difficult to secure the angle of view of 180 degrees as well as to correct astigmatism and coma, so that it is undesirable. On the other hand, when the ratio f2/f falls below the lower limit of conditional expression (8), the back focal length becomes too short to be able to be used for a SLR camera.

In a fisheye lens according to the second embodiment of the present invention, conditional expression (9) defines an appropriate range of the distance along the optical axis between the front lens group and the rear lens group. When the ratio d1/f is higher than or equal to the upper limit of conditional expression (9), lateral chromatic aberration becomes too large to correct properly. In addition, the back focal length becomes too short to be able to be used for a SLR camera. On the other hand, when the ratio d1/f is less than or equal to the lower limit of conditio al expression (9), it becomes difficult to secure the angle of view of 180 degrees as well as to correct astigmatism and coma, so that it is undesirable.

In the above-described construction, production of lateral chromatic aberration unable to be fully suppressed by the front lens group can be moderated by arranging a cemented lens component in the rear lens group. It is preferable to satisfy conditional expression (10).

In a fisheye lens according to the second embodiment of the present invention, conditional expression (10) defines an appropriate range of difference in Abbe numbers between the positive lens elements and negative lens elements of the rear lens group in order to correct lateral chromatic aberration and axial chromatic aberration produced in the front lens group. When the value vRP−vRN exceeds the upper limit of conditional expression (10), it becomes difficult to construct the lens system by available existing glass materials as well as to correct axial chromatic aberration. On the other hand, when the value vRP−vRN falls below the lower limit of conditional expression (10), lateral chromatic aberration produced by negative lens components in the front lens group becomes difficult to be corrected by the rear lens group and lateral chromatic aberration at g-line (λ=435.8 nm) tends to become negative, so that it is undesirable.

In a fisheye lens according to the second embodiment of the present invention, conditional expression (11) is for correcting curvature of field and astigmatism. By setting refractive index of the negative lens as high as possible and that of the positive lens as low as possible, Petzval sum of the whole lens system can be lowered and curvature of field and astigmatism can be suppressed to be small. When the value nRN−nRP exceeds the upper limit of conditional expression (11), the difference in Abbe numbers between negative lens elements and positive lens elements has to be set larger, so that it becomes difficult to correct axial chromatic aberration produced in the front lens group. On the other hand, when the value nRN−nRP falls below the lower limit of conditional expression (11), Petzval sum of the whole lens system becomes large to produce large amount of curvature of field, so that it is undesirable.

When the focusing of the lens is carried out from infinity to close object, in order to prevent degradation of optical performance when focusing to a close object, it is preferable that the lens is moved to the object side with increasing the distance between the front lens group and the rear lens group.

In the above-described construction, it is preferable that each lens surface of the front and rear lens groups is constructed by a spherical surface or a plane surface without using an aspherical surface. Accordingly, it becomes easier to manufacture, assemble, and adjust each lens element, so that manufacturing cost can be lowered.

Each example of the fisheye lens according to the second embodiment of the present invention is shown below.

FIGS. 9, 11, 13, and 15 are sectional views showing fisheye lenses according to Examples 11 through 14 of the second embodiment of the present invention, respectively. In respective sectional views, a plane parallel plate P, S and I denote a filter, an aperture stop, and an image plane respectively. The filter and the aperture stop are arranged between the front lens group G1 and the rear lens group G2. The filter that may be inserted into any place in the fisheye lens has substantially no effect on the lens. Moreover, if the fisheye lens does not have the filter, the basic optical performance of the lens is not substantially affected.

FIGS. 10, 12, 14, and 16 graphically show various aberrations of the fisheye lenses according to Examples 11 through 14 of the second embodiment of the present invention, respectively. As is shown from respective graphs, each aberration is corrected preferably.

EXAMPLE 11

A fisheye lens according to Example 11 of the second embodiment shown in FIG. 9 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, and a fourth lens component L4 being a cemented positive lens component constructed by a positive lens element cemented with a negative lens element. The rear lens group G2 is composed of, in order from the object, a fifth lens component L5 having a double convex shape with positive refractive power, a sixth lens component L6 being a cemented negative lens component constructed by a negative lens element cemented with a positive lens element, and a seventh lens component L7 having a double convex shape with positive refractive power.

Various values associating Example 11 are shown in Table 11.

TABLE 11

| (Specification) | |
|---|---|
| f = | 10.5 |
| FNO = | 2.8 |

TABLE 11-continued

| | | | |
|---|---|---|---|
| 2ω = | | 180.4 | |
| Bf = | | 38.0 | |
| TL = | | 102.0 | |

(Lens Data)

| Surface Number | r | d | νd | nd |
|---|---|---|---|---|
| 1 | 72.411 | 2.50 | 60.68 | 1.60311 |
| 2 | 15.735 | 15.92 | | 1.00000 |
| 3 | 28.617 | 1.00 | 60.09 | 1.64000 |
| 4 | 12.674 | 4.85 | | 1.00000 |
| 5 | −23.498 | 1.35 | 60.09 | 1.64000 |
| 6 | 14.527 | 4.91 | 35.3 | 1.59270 |
| 7 | −25.302 | 0.50 | | 1.00000 |
| 8 | 79.663 | 3.50 | 35.3 | 1.59270 |
| 9 | −11.788 | 5.58 | 40.77 | 1.88300 |
| 10 | −52.783 | 4.69 | | 1.00000 |
| 11 | S | 3.75 | | 1.00000 |
| 12 | ∞ | 1.00 | 64.14 | 1.51633 |
| 13 | ∞ | 1.41 | | 1.00000 |
| 14 | 1042.319 | 2.33 | 70.24 | 1.48749 |
| 15 | −25.279 | 1.00 | | 1.00000 |
| 16 | −134.056 | 1.00 | 25.43 | 1.80518 |
| 17 | 23.381 | 4.31 | 52.42 | 1.51742 |
| 18 | −30.241 | 0.10 | | 1.00000 |
| 19 | 32.329 | 4.30 | 70.24 | 1.48749 |
| 20 | −48.237 | Bf | | 1.00000 |

(Values for the conditional expressions)

(6) |R|/f = 2.238
(7) Σd/f = 6.096
(8) f2/f = 2.281
(9) d1/f = 1.033
(10) νRP − νRN = 38.87
(11) nRN − nRP = 0.308

EXAMPLE 12

A fisheye lens according to Example 12 of the second embodiment shown in FIG. 11 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, and a fourth lens component L4 being a cemented positive lens component constructed by a positive lens element cemented with a negative lens element. The rear lens group G2 is composed of, in order from the object, a fifth lens component L5 having positive refractive power and a positive meniscus shape with a stronger convex surface facing to an image, a sixth lens component L6 being a cemented positive lens component constructed by a negative lens element cemented with a positive lens element, and a seventh lens component L7 having a double convex shape.

Various values associating Example 12 are shown in Table 12.

TABLE 12

(Specification)

| | |
|---|---|
| f = | 10.5 |
| FNO = | 2.8 |

TABLE 12-continued

| | | | |
|---|---|---|---|
| 2ω = | | 184.9 | |
| Bf = | | 38.0 | |
| TL = | | 102.0 | |

(Lens Data)

| Surface Number | r | d | νd | nd |
|---|---|---|---|---|
| 1 | 88.456 | 2.50 | 63.38 | 1.61800 |
| 2 | 15.969 | 17.68 | | 1.00000 |
| 3 | 30.019 | 1.00 | 46.58 | 1.80400 |
| 4 | 14.663 | 7.68 | | 1.00000 |
| 5 | −19.270 | 1.00 | 63.38 | 1.61800 |
| 6 | 10.973 | 4.91 | 35.3 | 1.59270 |
| 7 | −21.519 | 0.50 | | 1.00000 |
| 8 | 93.372 | 2.77 | 52.42 | 1.51742 |
| 9 | −14.476 | 1.00 | 42.72 | 1.83481 |
| 10 | −35.244 | 5.71 | | 1.00000 |
| 11 | S | 4.36 | | 1.00000 |
| 12 | ∞ | 1.00 | 64.14 | 1.51633 |
| 13 | ∞ | 2.29 | | 1.00000 |
| 14 | −82.227 | 1.94 | 81.61 | 1.49700 |
| 15 | −28.439 | 1.00 | | 1.00000 |
| 16 | 424.857 | 1.00 | 23.78 | 1.84666 |
| 17 | 29.343 | 3.90 | 81.61 | 1.49700 |
| 18 | −30.672 | 0.10 | | 1.00000 |
| 19 | 39.192 | 3.68 | 70.24 | 1.48749 |
| 20 | −52.057 | Bf | | 1.00000 |

(Values for the conditional expressions)

(6) |R|/f = 1.835
(7) Σd/f = 6.095
(8) f2/f = 2.477
(9) d1/f = 1.271
(10) νRP − νRN = 54.04
(11) nRN − nRP = 0.353

EXAMPLE 13

A fisheye lens according to Example 13 of the second embodiment shown in FIG. 13 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 being a cemented negative lens component constructed by a negative lens element cemented with a positive lens element, a fourth lens component L4 having a double convex shape with positive refractive power, and a fifth lens component L5 being a cemented negative lens component constructed by a positive lens element cemented with a negative lens element. The rear lens group G2 is composed of, in order from the object, a sixth lens component L6 having positive refractive power and a positive meniscus shape with a stronger convex surface facing to an image, a seventh lens component L7 being a cemented positive lens component constructed by a negative lens element cemented with a positive lens element, and an eighth lens component L8 having a double convex shape with positive refractive power.

Various values associating Example 13 are shown in Table 13.

TABLE 13

(Specification)

| | |
|---|---|
| f = | 10.5 |
| FNO = | 2.8 |
| 2ω = | 180.0 |
| Bf = | 38.0 |
| TL = | 102.0 |

(Lens Data)

| Surface Number | r | d | νd | nd |
|---|---|---|---|---|
| 1 | 72.031 | 2.50 | 63.38 | 1.61800 |
| 2 | 15.316 | 9.37 | | 1.00000 |
| 3 | 71.220 | 2.00 | 46.58 | 1.80400 |
| 4 | 21.254 | 13.56 | | 1.00000 |
| 5 | −19.566 | 1.00 | 63.38 | 1.61800 |
| 6 | 12.221 | 4.89 | 35.3 | 1.59270 |
| 7 | −29.281 | 0.10 | | 1.00000 |
| 8 | 115.189 | 3.41 | 35.3 | 1.59270 |
| 9 | −35.850 | 0.10 | | 1.00000 |
| 10 | 38.990 | 2.97 | 54.68 | 1.51454 |
| 11 | −16.347 | 1.00 | 42.72 | 1.83481 |
| 12 | 128.223 | 5.85 | | 1.00000 |
| 13 | S | 4.09 | | 1.00000 |
| 14 | ∞ | 1.00 | 64.14 | 1.51633 |
| 15 | ∞ | 2.09 | | 1.00000 |
| 16 | −87.929 | 2.30 | 81.61 | 1.49700 |
| 17 | −23.390 | 0.10 | | 1.00000 |
| 18 | 252.650 | 1.00 | 25.43 | 1.80518 |
| 19 | 27.543 | 3.68 | 81.61 | 1.49700 |
| 20 | −36.636 | 0.10 | | 1.00000 |
| 21 | 33.519 | 3.36 | 81.61 | 1.49700 |
| 22 | −95.905 | Bf | | 1.00000 |

(Values for the conditional expressions)

(6) |R|/f = 1.863
(7) Σd/f = 6.095
(8) f2/f = 2.369
(9) d1/f = 1.241
(10) νRP − νRN = 56.18
(11) nRN − nRP = 0.308

EXAMPLE 14

A fisheye lens according to Example 14 of the second embodiment shown in FIG. 15 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having positive refractive power and a positive meniscus shape with a stronger convex surface facing to an image, a fourth lens component L4 being a cemented positive lens component constructed by a negative lens element cemented with a positive lens element, and a fifth lens component L5 being a cemented negative lens component constructed by a positive lens element cemented with a negative lens element. The rear lens group G2 is composed of, in order from the object, a sixth lens component L6 having positive refractive power and a positive meniscus shape with a stronger convex surface facing to the image, a seventh lens component L7 being a cemented positive lens component constructed by a negative lens element cemented with a positive lens element, and an eighth lens component L8 having a double convex shape with positive refractive power.

Various values associating Example 14 are shown in Table 14.

TABLE 14

(Specification)

| | |
|---|---|
| f = | 10.5 |
| FNO = | 2.8 |
| 2ω = | 180.5 |
| Bf = | 38.0 |
| TL = | 102.0 |

(Lens Data)

| Surface Number | r | d | νd | nd |
|---|---|---|---|---|
| 1 | 85.910 | 2.50 | 63.38 | 1.61800 |
| 2 | 15.764 | 14.28 | | 1.00000 |
| 3 | 64.782 | 2.00 | 46.58 | 1.80400 |
| 4 | 16.343 | 6.61 | | 1.00000 |
| 5 | −229.828 | 2.12 | 35.3 | 1.59270 |
| 6 | −29.589 | 0.85 | | 1.00000 |
| 7 | −16.981 | 1.50 | 63.38 | 1.61800 |
| 8 | 15.576 | 4.91 | 35.3 | 1.59270 |
| 9 | −17.821 | 0.64 | | 1.00000 |
| 10 | 73.809 | 2.81 | 52.42 | 1.51742 |
| 11 | −14.406 | 1.00 | 42.72 | 1.83481 |
| 12 | −87.316 | 5.74 | | 1.00000 |
| 13 | S | 4.48 | | 1.00000 |
| 14 | ∞ | 1.00 | 64.14 | 1.51633 |
| 15 | ∞ | 2.96 | | 1.00000 |
| 16 | −84.470 | 2.17 | 81.61 | 1.49700 |
| 17 | −24.565 | 0.10 | | 1.00000 |
| 18 | 327.100 | 1.00 | 23.78 | 1.84666 |
| 19 | 30.097 | 3.80 | 81.61 | 1.49700 |
| 20 | −32.410 | 0.10 | | 1.00000 |
| 21 | 36.747 | 3.42 | 70.24 | 1.48749 |
| 22 | −78.411 | Bf | | 1.00000 |

(Values for the conditional expressions)

(6) |R|/f = 1.617
(7) Σd/f = 6.090
(8) f2/f = 2.423
(9) d1/f = 1.349
(10) νRP − νRN = 52.39
(11) nRN − nRP = 0.308

Third Embodiment

A fisheye lens according to a third embodiment of the present invention is explained below.

A fisheye lens according to the third embodiment of the present invention consists of a front lens group having negative refractive power and a rear lens group having positive refractive power locating with a space along the optical axis apart from the front lens group. The rear lens group includes a cemented lens component and the following conditional expressions (12) and (15) are satisfied. The rear lens group may additionally include the expression (13).

$$Bf/f \geq 3.45 \quad (12)$$

$$0.5 < d1/f < 2.0 \quad (15)$$

$$4.0 \leq \Sigma d/f \leq 10.0 \quad (13)$$

where f denotes the focal length of the fisheye lens, Bf denotes the back focal length, d1 denotes the distance along the optical axis between the front lens group and the rear lens group, and Σd denotes the distance from the most object side lens surface to the most image side lens surface of the fisheye lens when focusing at infinity.

The front lens group has a negative refractive power component having strong divergent effect to deflect light ray entering from a wide incident range of 180 degrees to a direction parallel to the optical axis. By constructing the negative refractive power component of the front lens group with a plurality of negative lens components aberrations produced thereby can be spread to or shared by the plurality of the negative refractive power components. In addition, by including a cemented lens component in the front lens group, production of lateral chromatic aberration can be suppressed.

In the third embodiment, the following conditional expressions (14), (16) and (17) may be satisfied;

$$1.5 \leq f2/f \leq 4.0 \quad (14)$$

$$30 \leq vRP - vRN \leq 60 \quad (16)$$

$$0.2 \leq nRN - nRP \leq 0.45 \quad (17)$$

where f2 denotes the focal length of the rear lens group, vRP denotes the mean value of Abbe numbers of the positive lens components in the rear lens group, vRN denotes the mean value of Abbe numbers of the negative lens components in the rear lens group, nRN denotes the mean value of refractive indices of the negative lens components in the rear lens group at d-line ($\lambda=587.6$ nm) and nRP denotes the mean value of refractive indices of the positive lens components in the rear lens group at d-line ($\lambda=587.6$ nm).

The respective conditional expressions are explained blow.

Conditional expression (12) defines the relation between the focal length of the whole system and the back focal length of the fisheye lens according to the third embodiment of the present invention. When the ratio Bf/f falls below the lower limit of conditional expression (12), it becomes difficult to use for a SLR camera, so that it is undesirable.

In a fisheye lens according to the third embodiment of the present invention, conditional expression (15) defines an appropriate range of the distance along the optical axis between the front lens group and the rear lens group. When the ratio d1/f is higher than or equal to the upper limit of conditional expression (15), lateral chromatic aberration becomes too large to correct properly. In addition, the back focal length becomes too short to be able to be used for a SLR camera. On the other hand, when the ratio d1/f is less than or equal to the lower limit of conditional expression (15), it becomes difficult to secure the angle of view of 180 degrees as well as to correct astigmatism and coma, so that it is undesirable. In order to obtain better optical performance, it is preferable to set the lower limit to 0.6.

In a fisheye lens according to the third embodiment of the present invention, conditional expression (13) is for controlling or determining the whole size and weight of the lens with securing sufficient back focal length and correcting off-axis aberrations. When the ratio Σd/f exceeds the upper limit of conditional expression (13), the back focal length becomes too short to be able to be used for a SLR camera. Moreover, in order to pass light ray entering from a wide incident range of 180 degrees, the diameter (front lens diameter) of the lens component locating to the most object side becomes extremely large, so that the whole lens becomes large in size and heavy in weight. In order to obtain good optical performance, it is preferable that the upper limit is set to 8.0. On the other hand, when the ratio Σd/f falls below the lower limit of conditional expression (13), although the back focal length can be secured sufficiently, it becomes difficult to maintain the angle of view of 180 degrees, so that it is undesirable. In order to obtain good optical performance, it is preferable that the lower limit is set to 5.0.

In a fisheye lens according to the third embodiment of the present invention, conditional expression (14) defines an appropriate range of the focal length of the rear lens group with securing sufficient back focal length and correcting off-axis aberrations. When the ratio f2/f exceeds the upper limit of conditional expression (14), it becomes difficult to secure the angle of view of 180 degrees as well as to correct astigmatism and coma, so that it is undesirable. On the other hand, when the ratio f2/f falls below the lower limit of conditional expression (14), the back focal length becomes too short to be able to be used for a SLR camera.

In the above-described construction, production of lateral chromatic aberration unable to be fully suppressed by the front lens group can be moderated by arranging a cemented lens component in the rear lens group. It is preferable to satisfy conditional expression (16).

In a fisheye lens according to the third embodiment of the present invention, conditional expression (16) defines an appropriate range of difference in Abbe numbers between the positive lens element and negative lens element in the rear lens group in order to correct lateral chromatic aberration and axial chromatic aberration produced in the front lens group. When the value vRP−vRN exceeds the upper limit of conditional expression (16), it becomes difficult to construct the lens system by available glass materials as well as to correct axial chromatic aberration. On the other hand, when the value vRP−vRN falls below the lower limit of conditional expression (16), lateral chromatic aberration produced by negative lens components in the front lens group becomes difficult to be corrected by the rear lens group and lateral chromatic aberration at g-line ($\lambda=435.8$ nm) tends to become negative, so that it is undesirable.

In a fisheye lens according to the third embodiment of the present invention, conditional expression (17) is for correcting curvature of field and astigmatism. By setting refractive index of the negative lens element in the rear lens group G2 as high as possible and that of the positive lens element as low as possible, Petzval sum of the fisheye lens can be lowered and curvature of field and astigmatism can be suppressed to be small. When the value nRN−nRP exceeds the upper limit of conditional expression (17), the difference in Abbe numbers between negative lens element and positive lens element has to be set larger, so that it becomes difficult to correct axial chromatic aberration produced in the front lens group. On the other hand, when the value nRN−nRP falls below the lower limit of conditional expression (17), Petzval sum of the whole lens system becomes large to produce large amount of curvature of field, so that it is undesirable.

When the focusing of the lens is carried out from infinity to close object, in order to prevent degradation of optical performance when focusing to a close object, it is preferable that the lens is moved to the object side with increasing the distance between the front lens group and the rear lens group.

In the above-described construction, it is preferable that each lens surface of the front and rear lens groups is constructed by a spherical surface or a plane surface without using an aspherical surface. Accordingly, it becomes easier to manufacture, assemble, and adjust each lens element, so that manufacturing cost can be lowered.

Each example of the fisheye lens according to the third embodiment of the present invention is shown below.

FIGS. 1, 3, 5, and 7 are sectional views showing fisheye lenses according to Examples 15 through 18 of the third embodiment of the present invention, respectively. In respective sectional views, a plane parallel plate P, S and I denote a filter, an aperture stop, and an image plane respectively. The filter and the aperture stop are arranged between the front lens group G1 and the rear lens group G2. The filter that may be inserted into any place in the fisheye lens has substantially no effect on the lens. Moreover, if the fisheye lens does not have the filter, the basic optical performance of the lens is not substantially affected.

FIGS. 2, 4, 6, and 8 graphically show various aberrations of the fisheye lenses according to Examples 15 through 18 of the third embodiment of the present invention, respectively. As is shown from respective graphs, each aberration is corrected preferably.

EXAMPLE 15

A fisheye lens according to Example 15 of the third embodiment shown in FIG. 1 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, and a third lens component L3 being a cemented positive lens component constructed by a negative lens element cemented with a positive lens element. The rear lens group G2 is composed of, in order from the object, a fourth lens component L4 having a double convex shape with a stronger convex surface facing to an image, a fifth lens component L5 being a cemented positive lens component constructed by a negative lens element cemented with a positive lens element, and a sixth lens component L6 having a double convex shape with positive refractive power. All lens surfaces of the front and rear lens groups are composed of spherical surfaces.

Various values associating Example 15 are shown in Table 15.

TABLE 15

(Specification)

| | |
|---|---|
| f = | 10.0 |
| FNO = | 2.8 |
| 2ω = | 180.3 |
| Bf = | 38.0 |
| TL = | 101.9 |

(Lens Data)

| Surface Number | r | d | νd | nd |
|---|---|---|---|---|
| 1 | 70.000 | 1.50 | 60.68 | 1.60311 |
| 2 | 14.900 | 13.60 | | 1.00000 |
| 3 | 36.500 | 1.00 | 49.61 | 1.77250 |
| 4 | 15.300 | 16.90 | | 1.00000 |
| 5 | −956.300 | 1.00 | 52.32 | 1.75500 |
| 6 | 10.250 | 3.60 | 31.07 | 1.68893 |
| 7 | −66.600 | 0.85 | | 1.00000 |
| 8 | S | 8.20 | | 1.00000 |
| 9 | ∞ | 1.00 | 64.14 | 1.51633 |
| 10 | ∞ | 3.98 | | 1.00000 |
| 11 | 78.500 | 2.43 | 90.3 | 1.45600 |

TABLE 15-continued

| 12 | −32.600 | 1.00 | | 1.00000 |
|---|---|---|---|---|
| 13 | −232.900 | 1.00 | 23.78 | 1.84666 |
| 14 | 27.200 | 4.00 | 70.24 | 1.48749 |
| 15 | −29.900 | 0.10 | | 1.00000 |
| 16 | 41.200 | 3.78 | 70.24 | 1.48749 |
| 17 | −45.873 | Bf | | 1.00000 |

(Values for the conditional expressions)

(12) Bf/f = 3.80
(13) Σd/f = 6.39
(14) f2/f = 2.53
(15) d1/f = 1.40
(16) νRP − νRN = 53.15
(17) nRN − nRP = 0.37

EXAMPLE 16

A fisheye lens according to Example 16 of the third embodiment shown in FIG. 3 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double concave shape, and a fourth lens component L4 being a cemented positive lens component constructed by a positive lens element cemented with a negative lens element. The rear lens group G2 is composed of, in order from the object, a fifth lens component L5 having a positive meniscus shape with a stronger convex surface facing to an image, a sixth lens component L6 being a cemented negative lens component constructed by a negative lens element cemented with a positive lens element, and a seventh lens component L7 having a double convex shape with positive refractive power. All lens surfaces of the front and rear lens groups are composed of spherical surfaces.

Various values associating Example 16 are shown in Table 16.

TABLE 16

(Specification)

| | |
|---|---|
| f = | 10.5 |
| FNO = | 2.8 |
| 2ω = | 180.6 |
| Bf = | 38.0 |
| TL = | 102.0 |

(Lens Data)

| Surface Number | r | d | νd | nd |
|---|---|---|---|---|
| 1 | 85.122 | 2.50 | 55.52 | 1.69680 |
| 2 | 16.625 | 9.29 | | 1.00000 |
| 3 | 208.221 | 1.00 | 60.29 | 1.62041 |
| 4 | 28.271 | 17.17 | | 1.00000 |
| 5 | −284.146 | 1.00 | 60.09 | 1.64000 |
| 6 | 14.288 | 1.50 | | 1.00000 |
| 7 | 18.690 | 3.93 | 35.3 | 1.59270 |
| 8 | −12.457 | 1.00 | 39.59 | 1.80440 |
| 9 | −26.857 | 6.33 | | 1.00000 |
| 10 | S | 4.69 | | 1.00000 |
| 11 | ∞ | 1.00 | 64.14 | 1.51633 |
| 12 | ∞ | 2.47 | | 1.00000 |

TABLE 16-continued

| | | | | |
|---|---|---|---|---|
| 13 | −196.193 | 2.15 | 48.87 | 1.53172 |
| 14 | −27.112 | 1.00 | | 1.00000 |
| 15 | −179.223 | 1.00 | 25.43 | 1.80518 |
| 16 | 24.353 | 4.07 | 81.61 | 1.49700 |
| 17 | −32.401 | 0.10 | | 1.00000 |
| 18 | 40.920 | 3.82 | 70.24 | 1.48749 |
| 19 | −43.401 | Bf | | 1.00000 |

(Values for the conditional expressions)

(12) Bf/f = 3.62
(13) Σd/f = 6.10
(14) f2/f = 2.57
(15) d1/f = 1.38
(16) νRP − νRN = 41.48
(17) nRN − nRP = 0.30

EXAMPLE 17

A fisheye lens according to Example 17 of the third embodiment shown in FIG. 5 is composed of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double convex shape with positive refractive power, and a fourth lens component L4 being a cemented negative lens component constructed by a positive lens element cemented with a negative lens element. The rear lens group G2 is composed of, in order from the object, a fifth lens component L5 having a double convex shape with positive refractive power, a sixth lens component L6 being a cemented negative lens component constructed by a negative lens element cemented with a positive lens element, and a seventh lens component L7 having a double convex shape with positive refractive power. All lens surfaces of the front and rear lens groups are composed of spherical surfaces.

Various values associating Example 17 are shown in Table 17.

TABLE 17

(Specification)

| | |
|---|---|
| f = | 10.5 |
| FNO = | 2.8 |
| 2ω = | 180.7 |
| Bf = | 38.0 |
| TL = | 100.0 |

(Lens Data)

| Surface Number | r | d | νd | nd |
|---|---|---|---|---|
| 1 | 84.102 | 2.50 | 46.63 | 1.81600 |
| 2 | 14.531 | 7.29 | | 1.00000 |
| 3 | 166.427 | 2.00 | 49.61 | 1.77250 |
| 4 | 18.949 | 10.23 | | 1.00000 |
| 5 | 31.103 | 4.13 | 25.43 | 1.80518 |
| 6 | −43.681 | 2.68 | | 1.00000 |
| 7 | 15.055 | 2.99 | 52.42 | 1.51742 |
| 8 | −31.790 | 1.00 | 42.72 | 1.83481 |
| 9 | 10.752 | 5.29 | | 1.00000 |

TABLE 17-continued

| | | | | |
|---|---|---|---|---|
| 10 | S | 4.83 | | 1.00000 |
| 11 | ∞ | 1.00 | 64.14 | 1.51633 |
| 12 | ∞ | 1.00 | | 1.00000 |
| 13 | 34.823 | 6.00 | 70.24 | 1.48749 |
| 14 | −16.988 | 0.15 | | 1.00000 |
| 15 | −52.806 | 1.00 | 37.17 | 1.83400 |
| 16 | 18.437 | 5.30 | 70.24 | 1.48749 |
| 17 | −24.894 | 0.10 | | 1.00000 |
| 18 | 33.005 | 4.51 | 81.61 | 1.49700 |
| 19 | −49.526 | Bf | | 1.00000 |

(Values for the conditional expressions)

(12) Bf/f = 3.62
(13) Σd/f = 5.90
(14) f2/f = 2.01
(15) d1/f = 1.15
(16) νRP − νRN = 36.86
(17) nRN − nRP = 0.34

EXAMPLE 18

A fisheye lens according to Example 18 of the third embodiment shown in FIG. 7 consists of a front lens group G1 having negative refractive power, and a rear lens group G2 having positive refractive power arranged with a space along the optical axis apart from the front lens group G1. The front lens group G1 is composed of, in order from an object, a first lens component L1 having a negative meniscus shape with a convex surface toward the object, a second lens component L2 having a negative meniscus shape with a convex surface toward the object, a third lens component L3 having a double convex shape with positive refractive power, and a fourth lens component L4 being a cemented negative lens component constructed by a positive lens element cemented with a negative lens element. The rear lens group G2 is composed of, in order from the object, a fifth lens component L5 having a double convex shape, a sixth lens component L6 being a cemented negative lens component constructed by a negative lens element cemented with a positive lens element, and a seventh lens component L7 having a double convex shape with positive refractive power. All lens surfaces of the front and rear lens groups are composed of spherical surfaces. In each example described above, it is needless to say that any surface may be a plane surface.

Various values associating Example 18 are shown in Table 18.

TABLE 18

(Specification)

| | |
|---|---|
| f = | 10.5 |
| FNO = | 2.8 |
| 2ω = | 180.7 |
| Bf = | 37.4 |
| TL = | 99.4 |

(Lens Data)

| Surface Number | r | d | νd | nd |
|---|---|---|---|---|
| 1 | 82.344 | 2.500 | 46.63 | 1.81600 |
| 2 | 14.141 | 7.295 | | 1.00000 |
| 3 | 174.256 | 2.000 | 49.61 | 1.77250 |
| 4 | 20.126 | 10.227 | | 1.00000 |
| 5 | 31.775 | 4.130 | 25.43 | 1.80518 |

TABLE 18-continued

| | | | | |
|---|---|---|---|---|
| 6 | −45.533 | 2.679 | | 1.00000 |
| 7 | 13.721 | 2.994 | 52.42 | 1.51742 |
| 8 | −43.798 | 1.000 | 42.72 | 1.83481 |
| 9 | 10.077 | 5.293 | | 1.00000 |
| 10 | S | 4.831 | | 1.00000 |
| 11 | ∞ | 1.000 | 64.14 | 1.51633 |
| 12 | ∞ | 1.000 | | 1.00000 |
| 13 | 37.218 | 6.000 | 70.24 | 1.48749 |
| 14 | −16.168 | 0.150 | | 1.00000 |
| 15 | −50.683 | 1.000 | 37.17 | 1.83400 |
| 16 | 18.476 | 5.296 | 70.24 | 1.48749 |
| 17 | −24.785 | 0.100 | | 1.00000 |
| 18 | 31.496 | 4.507 | 81.61 | 1.49700 |
| 19 | −53.726 | Bf | | 1.00000 |

(Values for the conditional expressions)

(12) Bf/f = 3.62
(13) Σd/f = 5.90
(14) f2/f = 2.00
(15) d1/f = 1.15
(16) vRP − vRN = 36.86
(17) nRN − nRP = 0.34

As described above, the present invention makes it possible to provide a fisheye lens, in spite of its compactness, having an angle of view of 180 degrees and a fast f-number of 2.8 with securing sufficient back focal length and suitable for a digital camera.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fisheye lens comprising:
a front lens group having negative refractive power, and
a rear lens group having positive refractive power locating with a space along the optical axis apart from the front lens group,
the front lens group comprising a plurality of negative lens components;
the rear lens group comprising at least one cemented lens component; and
the following conditional expression is satisfied:

$$4.0 \leq \Sigma d/f \leq 10.0$$

where f denotes the focal length of the fisheye lens and Σd denotes the distance from the most object side lens surface to the most image side lens surface of the fisheye lens when focusing at infinity.

2. The fisheye lens according to claim 1, wherein the front lens group includes at least one cemented lens component locating to the image side of the plurality of negative lens components.

3. The fisheye lens according to claim 2, wherein the following conditional expression is satisfied:

$$1.5 \leq f2/f \leq 4.0$$

where f2 denotes the focal length of the rear lens group.

4. The fisheye lens according to claim 3, wherein the rear lens group includes, in order from the object, a positive lens component, a cemented lens component constructed by a negative lens element cemented with a positive lens element, and a positive lens component.

5. The fisheye lens according to claim 4, wherein the following conditional expression is satisfied:

$$30 \leq vRP - vRN \leq 60$$

where vRP denotes the mean value of Abbe numbers of the positive lens elements in the lens components in the rear lens group and vRN denotes the mean value of Abbe numbers of the negative lens elements in the lens components in the rear lens group.

6. The fisheye lens according to claim 4, wherein the following conditional expression is satisfied;

$$0.2 \leq nRN - nRP \leq 0.45$$

where nRN denotes the mean value of refractive indices of the negative lens elements in the lens components in the rear lens group at d-line (λ=587.7 nm) and nRP denotes the mean value of refractive indices of the positive lens elements in the lens components in the rear lens group at d-line (λ=587.6 nm).

7. The fisheye lens according to claim 1, wherein the following conditional expression is satisfied:

$$1.5 \leq f2/f \leq 4.0$$

where f2 denotes the focal length of the rear lens group.

8. The fisheye lens according to claim 1, wherein the rear lens group includes, in order from the object, a positive lens component, a cemented lens component constructed by a negative lens element cemented with a positive lens element, and a positive lens component.

9. The fisheye lens according to claim 1, wherein the following conditional expression is satisfied:

$$0.5 \leq d1/f \leq 2.0$$

where d1 denotes the distance along the optical axis between the front lens group and the rear lens group.

10. The fisheye lens according to claim 1, wherein each of all lens surfaces of the front lens group and the rear lens group is constructed by any one of a spherical surface and a plane surface.

11. The fisheye lens according to claim 1, wherein when the focusing of the lens is moved from infinity to close object, the lens is moved to the object side with increasing the distance between the front lens group and the rear lens group.

12. A fisheye lens comprising:
a front lens group having negative refractive power, and
a rear lens group having positive refractive power locating with a space along the optical axis apart from the front lens group;
the front lens group comprising, in order from an object, a plurality of negative lens components, and two cemented lenses components;
at least one of the two cemented lens components including a negative lens element arranged to the object side, which the negative lens element satisfies the following conditional expression:

$$1.0 < |R|/f < 4.0$$

where f denotes the focal length of the fisheye lens and R denotes the radius of curvature of the object side surface of said negative lens element arranged to the object side.

13. The fisheye lens according to claim 12, wherein the front lens group includes, in order from the object,
a first lens component having a negative meniscus shape with a convex surface toward the object;
a second lens component having a negative meniscus shape with a convex surface toward the object;

a third lens component including a cemented lens component constructed by a negative lens element cemented with a positive lens element; and a fourth lens component including a cemented lens component constructed by a positive lens element cemented with a negative lens element;

wherein said plurality of negative lens components are composed of the first lens component and the second lens component, and the two cemented lens components are composed of a third lens component and a fourth lens component.

14. The fisheye lens according to claim 12, wherein the front lens group includes, in order from the object, a first lens component having a negative meniscus shape with a convex surface toward the object;

a second lens component having a negative meniscus shape with a convex surface toward the object;

a third lens component including a cemented lens component constructed by a negative lens element cemented with a positive lens element;

a fourth lens component including a positive lens element; and a fifth lens component including a cemented component lens constructed by a positive lens element cemented with a negative lens element;

wherein said plurality of negative lens components are composed of said first lens component and said second lens component, and said two cemented lens components are composed of said third lens component and said fifth lens component.

15. The fisheye lens according to claim 12, wherein the front lens group includes, in order from the object, a first lens component having a negative meniscus shape with a convex surface toward the object;

a second lens component having a negative meniscus shape with a convex surface toward the object;

a third lens component including a positive lens element;

a fourth lens component including a cemented component lens constructed by a negative lens element cemented with a positive lens element; and a fifth lens component including a cemented lens component constructed by a positive lens element cemented with a negative lens element;

wherein said plurality of negative lens components are composed of said first lens component and said second lens component, and said two cemented lenses are composed of said fourth lens component and said fifth lens component.

16. The fisheye lens according to claim 12, wherein the following conditional expression is satisfied:

$$4.0 \leq \Sigma d/f \leq 10.0$$

where f denotes the focal length of the fisheye lens and $\Sigma d$ denotes the distance from the most object side lens surface to the most image side lens surface of the fisheye lens when focusing at infinity.

17. The fisheye lens according to claim 16, wherein the following conditional expression is satisfied:

$$1.5 \leq f2/f \leq 4.0$$

where f2 denotes the focal length of the rear lens group.

18. The fisheye lens according to claim 12, wherein the rear lens group includes, in order from the object, a positive lens component, a cemented lens component constructed by a negative lens element cemented with a positive lens element, and a positive lens component.

19. The fisheye lens according to claim 18, wherein the following conditional expression is satisfied:

$$30 \leq vRP - vRN \leq 60$$

where vRP denotes the mean value of Abbe numbers of the positive lens elements in the lens components in the rear lens group and vRN denotes the mean value of Abbe numbers of the negative lens elements in the lens components in the rear lens group.

20. The fisheye lens according to claim 18, wherein the following conditional expression is satisfied:

$$0.2 \leq nRK - nRP \leq 0.45$$

where nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

21. The fisheye lens according to claim 12, wherein the following conditional expression is satisfied:

$$0.5 < d1/f < 2.0$$

where d1 denotes the distance along the optical axis between the front lens group and the rear lens group.

22. The fisheye lens according to claim 12, wherein each of all lens surfaces of the front lens group and the rear lens group is constructed by any one of a spherical surface and a plane surface.

23. The fisheye lens according to claim 12, wherein when the focusing of the lens is moved from infinity to close object, the lens is moved to the object side with increasing the distance between the front lens group and the rear lens group.

24. A fisheye lens comprising:

a front lens group having negative refractive power, and a rear lens group having positive refractive power locating with a space along the optical axis apart from the front lens group, the front lens group comprising, in order from an object, a plurality of negative lens components, and a cemented lens component; and the rear lens group comprising a cemented lens component;

wherein the following conditional expressions are satisfied:

$$Bf/f \geq 3.45$$

$$0.5 < d1/f < 2.0$$

where Bf denotes the back focal length of the fisheye lens, d1 denotes the distance along the optical axis between the most image side lens surface of the front lens group and the most object side lens surface of the rear lens group, and f denotes the focal length of the fisheye lens.

25. The fisheye lens according to claim 24, wherein the following conditional expression is satisfied:

$$4.0 \leq \Sigma d/f \leq 10.0$$

where f denotes the focal length of the fisheye lens and $\Sigma d$ denotes the distance from the most object side lens surface to the most image side lens surface of the fisheye lens when focusing at infinity.

26. The fisheye lens according to claim 24, wherein the front lens group includes, in order from the object, a first lens component having a negative meniscus shape with a convex surface toward the object, a second lens component having a negative meniscus shape with a convex surface toward the object, and a third lens component including a cemented lens component constructed by a negative lens element cemented with a positive lens element.

27. The fisheye lens according to claim 24, wherein the front lens group includes, in order from the object, a first lens component having a negative meniscus shape with a convex surface toward the object, a second lens component having a negative meniscus shape with a convex surface toward the object, a third lens component including only a negative lens element, and a fourth lens component including a cemented lens constructed by a positive lens element cemented with a negative lens element.

28. The fisheye lens according to claim 24, wherein the front lens group includes, in order from the object, a first lens component having a negative meniscus shape with a convex surface toward the object, a second lens component having a negative meniscus shape with a convex surface toward the object;

a third lens component including only a positive lens element, and a fourth lens component including a cemented lens component constructed by a positive lens element cemented with a negative lens element.

29. The fisheye lens according to claim 24, wherein the rear lens group includes, in order from the object, a positive lens component, a cemented lens component constructed by a negative lens element cemented with a positive lens element, and a positive lens component.

30. The fisheye lens according to claim 29, wherein the following conditional expression is satisfied:

$$1.5 \leq f2/f \leq 4.0$$

where f2 denotes the focal length of the rear lens group.

31. The fisheye lens according to claim 29, wherein component the following conditional expression is satisfied;

$$30 \leq vRP - vRN \leq 60$$

where vRP denotes the mean value of Abbe numbers of the positive lens elements in the lens components in the rear lens group and vRN denotes the mean value of Abbe numbers of the negative lens elements in the lens components in the rear lens group.

32. The fisheye lens according to claim 29, wherein the following conditional expression is satisfied;

$$0.2 \leq nRN - nRP \leq 0.45$$

where nRN denotes the mean value of refractive indices of the negative lens elements in the lens components in the rear lens group at d-line ($\lambda$=587.6 nm) and nRP denotes the mean value of refractive indices of the positive lens elements in the lens components in the rear lens group at d-line ($\lambda$=587.6 nm).

33. The fisheye lens according to claim 24, wherein each of all lens surfaces of the front lens group and the rear lens group is constructed by any one of a spherical surface and a plane surface.

34. The fisheye lens according to claim 24, wherein when the focusing of the lens is moved from infinity to close object, the lens is moved to the object side with increasing the distance between the front lens group and the rear lens group.

35. A method for forming an image of an object, comprising:

providing a fisheye lens including a front lens group having negative refractive power and a rear lens group having positive refractive power, the front lens group having a plurality of negative lens components, the rear lens group being located apart from the front lens group with a space along an optical axis and having at least one cemented lens component, the following conditional expression being satisfied:

$$4.0 \leq \Sigma d/f \leq 10.0$$

where f denotes the focal length of the fisheye lens and $\Sigma$d denotes the distance from the most object side lens surface to the most image side lens surface of the fisheye lens when focusing on infinity; and using the fisheye lens to form the image of the object.

36. The method according to claim 35, wherein the front lens group includes at least one cemented lens component located to the image side of the plurality of negative lens components.

37. A method for forming an image of an object, comprising:

providing a fisheye lens including a front lens group having negative refractive power and a rear lens group having positive refractive power, the front lens group having, in order from the object, a plurality of negative lens components and two cemented lens components, at least one of the two cemented lens components including a negative lens element arranged to the object side, the rear lens group being located apart from the front lens group with a space along an optical axis, the following conditional expression being satisfied by the negative lens element:

$$1.0 < |R|/f < 4.0$$

where f denotes the focal length of the fisheye lens and R denotes the radius of curvature of the object side surface of the negative lens element; and using the fisheye lens to form the image of the object.

38. A method for forming an image of an object, comprising:

providing a fisheye lens including a front lens group having negative refractive power and a rear lens group having positive refractive power, the front lens group having, in order from an object, a plurality of negative lens components and a cemented lens component, the rear lens group being located apart from the front lens group with a space along an optical axis and having a cemented lens component;

the following conditional expressions being satisfied:

$$Bf/f \geq 3.45$$

$$0.5 < d1/f < 2.0$$

where Bf denotes the back focal length of the fisheye lens, d1 denotes the distance along the optical axis between the most image side lens surface of the front lens group and the most object side lens surface of the rear lens group, and f denotes the focal length of the fisheye lens; and using the fisheye lens to form the image of the object.

* * * * *